(12) United States Patent
Joshi et al.

(10) Patent No.: US 9,602,428 B2
(45) Date of Patent: Mar. 21, 2017

(54) METHOD AND APPARATUS FOR LOCALITY SENSITIVE HASH-BASED LOAD BALANCING

(71) Applicant: Telefonaktiebolaget L M Ericsson (publ), Stockholm (SE)

(72) Inventors: Vinayak Joshi, Bangalore (IN); Srikar Rajamani, Bangalore (IN)

(*) Notice: Subject to any disclaimer, the term of this patent is extended or adjusted under 35 U.S.C. 154(b) by 291 days.

(21) Appl. No.: 14/167,891

(22) Filed: Jan. 29, 2014

(65) Prior Publication Data
US 2015/0215236 A1    Jul. 30, 2015

(51) Int. Cl.
*H04L 12/927*    (2013.01)
*G06F 7/24*    (2006.01)
*G06F 17/30*    (2006.01)
*H04L 29/08*    (2006.01)

(52) U.S. Cl.
CPC .............. *H04L 47/806* (2013.01); *G06F 7/24* (2013.01); *G06F 17/3033* (2013.01); *H04L 67/1002* (2013.01)

(58) Field of Classification Search
CPC ..................... G06F 17/30445; G06F 17/30545
USPC ........................................................ 707/764
See application file for complete search history.

(56) References Cited

U.S. PATENT DOCUMENTS

| | | | |
|---|---|---|---|
| 739,557 A * | 9/1903 | Pendergast ........... | B65D 39/084 217/113 |
| 7,369,557 B1 | 5/2008 | Sinha | |
| 7,808,898 B2 | 10/2010 | Eswaran et al. | |
| 8,131,841 B2 | 3/2012 | Eswaran et al. | |
| 8,259,585 B1 | 9/2012 | S P et al. | |
| 8,578,049 B2 * | 11/2013 | Wu ...................... | H04L 45/7453 709/238 |
| 2005/0174272 A1 * | 8/2005 | Cadambi ........... | G06F 17/30949 341/106 |
| 2008/0126565 A1 * | 5/2008 | Osano .................... | H04L 45/14 709/242 |
| 2010/0070514 A1 * | 3/2010 | Woodruff ............ | G06F 17/3089 707/754 |

(Continued)

OTHER PUBLICATIONS

Dharmapurikar, Sarang, et al., "Longest Prefix Matching Using Bloom Filters", SIGCOMM'03, Aug. 25-29, 2003, 12 pages.

(Continued)

*Primary Examiner* — Boris Gorney
*Assistant Examiner* — Allen Lin
(74) *Attorney, Agent, or Firm* — Nicholson de Vos Webster & Elliott, LLP

(57) ABSTRACT

A method in a computing device for locality sensitive load balancing between servers includes receiving a packet and querying a plurality of Bloom filters, using keys based upon a plurality of header field values of the packet, to generate a plurality of candidate servers. A subset of the candidate servers were generated due to false positive matches occurring from some of the plurality of Bloom filters. One server of the plurality of servers is identified as the destination for the packet based upon identifying the subset of candidate servers within an entry of a false positive table. Each false positive table entry identifies, for a flow of packets, servers that are falsely included in sets of candidate servers generated by the plurality of Bloom filters for packets of that flow. The packet is transmitted to the first server.

20 Claims, 10 Drawing Sheets

(56) References Cited

U.S. PATENT DOCUMENTS

| | | | |
|---|---|---|---|
| 2011/0087779 A1* | 4/2011 | Martin | H04L 12/2602 709/224 |
| 2011/0296002 A1* | 12/2011 | Caram | H04L 43/18 709/224 |
| 2012/0002673 A1* | 1/2012 | Mohapatra | H04L 45/50 370/392 |
| 2013/0265875 A1* | 10/2013 | Dyke | H04L 67/1002 370/235 |
| 2014/0003421 A1 | 1/2014 | Alicherry et al. | |
| 2015/0149812 A1* | 5/2015 | Arisoylu | G06F 11/0793 714/4.1 |

OTHER PUBLICATIONS

Gou, Chengcheng, et al., "A load-balancing scheme based on Bloom Filters", 2010 Second International Conference on Future Networks, 2010 IEEE, 4 pages.

Kirsch, Adam, et al., "Hash-Based Techniques for High-Speed Packet Processing", Dec. 2009, 40 pages.

Song, Haoyu, et al., "Fast Hash Table Lookup Using Extended Bloom Filter: an Aid to Network Processing", SIGCOMM'05, Aug. 22-26, 2005, 12 pages, Pennsylvania, USA.

* cited by examiner

METHOD AND APPARATUS FOR LOCALITY SENSITIVE HASH-BASED LOAD BALANCING

FIELD

Embodiments of the invention relate to the field of networking; and more specifically, to methods, apparatuses, and systems for locality sensitive hash-based load balancing.

BACKGROUND

Effective load balancing for processing packets arriving as different flows has been a continuing problem in the field of networking. This load balancing may be necessary on intermediate network elements (e.g., path and link load balancing in routers/switches) or network elements closer to end points (e.g., server load balancing which front end server farms). Of late, the role of flow load balancing has only become more important with the advent of Software Defined Networking (SDN) systems (e.g., OpenFlow), where the processing of a packet is defined per flow.

Traditionally, a load balancer receives arriving packets and dispatches these packets to packet processing servers such that the packet-processing load is balanced across the servers. For example, on a services router (such as a Smart Services Router™ manufactured by Telefonaktiebolaget LM Ericsson of Stockholm, Sweden), a line card acts as the load balancer and the components that process packets on flows (e.g., perform Deep Packet Inspection (DPI)) on services cards act as the servers. In such devices, the line card receives traffic over its traffic ports and must dispatch the traffic across the service cards for further processing, which is dependent on the service type the packet belongs to.

One common algorithm for load balancing is Round Robin Scheduling, which sprays requests (e.g., packets) to different servers according to a defined ordering of the servers. Some round robin algorithms also attempt to take the load on each server into consideration before routing requests to them, so servers experiencing large loads may be skipped. Typically, the decision to route a request to a specific server results in creation of "session" state in the load balancer to ensure that all packets that belong to a particular session/flow get routed to the same server instance.

Per-packet load balancing provides a very granular level of load balancing across the servers. However, per-packet load balancing is not typically used in networking systems as it suffers from significant disadvantages, including a mandatory maintenance of all flow processing states in all servers, packet re-ordering issues, etc.

A commonly used alternative to per-packet load balancing is to employ some kind of hash mechanism using the flow identifier (typically the Internet Protocol version 4 (IPv4) or Transmission Control Protocol/Internet Protocol (TCP/IP) "5-tuple"—source IP address, destination IP address, source port, destination port, protocol) of each packet to distribute packets across the servers. The load balancer applies this hash to header field values of received packets, and packets belonging to the same hash bucket will be sent to the same server. Thus, this process ensures that packets on a given flow are always directed to the same server, as their header field values representing the flow identifier will always result in a same result from the application of the hash function. Although this method does not require any flow state maintenance within the load balancer, it may lead to skewed load distributions because the assignment of flows to servers does not take the existing load on the servers into account. Further, moving flows across servers is generally quite complex, or impossible, as flow assignment is based on a fixed hashing algorithm.

A more flexible per-flow load balancing mechanism would be to enable the load balancer to maintain mappings between flows and the assigned server for each flow (i.e., the server that "owns" the processing of the flow). Using such a mechanism, when a packet arrives on a flow at the load balancer, the mapping can be looked-up to dispatch the packet to the assigned server (assuming that the flow has already been assigned to a server). However, the role of the load balancer in this scenario mandates the maintenance of large mapping tables on the load balancer. To maintain the server assignment for every flow, the load balancer theoretically would need to maintain up to the order of $2^{(13*8)}$ entries for traditional IPv4 5-tuple flow identifiers, which is not practical for implementation in most load balancers due to table size scaling issues. For example, hardware commonly used for such purposes may, e.g., support only a 64 Kilobyte (K) table for the maintenance of flow entries, which is far too small for this purpose.

Thus, maintaining mappings for per-flow load balancing introduces one of the biggest limitations in any load balancer in terms of the scale it can support, as the flow table, where the saved session information is stored, is directly in the packet processing fast path and thus the storage space for such mappings is inherently limited. Several techniques have been used to attempt to remedy this storage problem, including maintaining a shadow flow table in DRAM and aging out the flows in the hardware flow table. Another technique includes algorithmically identifying long-lived and high volume flows as "elephant flows" and then instantiating session state only for those flows in the hardware flow table. Other similar approaches also exist that also focus upon solving the same problem of scaling up the load balancer by reducing the amount of session state created in the packet forwarding fast path. While these solutions alleviate the problem, they fall short of solving them completely primarily because they are still aimed at maintaining per-session state and can only achieve scale by reducing the number of sessions for which state needs to be maintained.

Accordingly, new techniques for per-flow load balancing that are both flexible, load-considerate, and state efficient are needed.

SUMMARY

According to an embodiment of the invention, a computing device to perform locality sensitive load balancing between a plurality of servers is described. The computing device includes a set of one or more network interfaces, a candidate generation module, a candidate filtering module, and a transmission module. The set of one or more network interfaces is to be communicatively coupled with a network to receive packets that include header field values that identify a flow each packet belongs to. The candidate generation module is coupled to the set of network interfaces and is configured to, for each of the received packets, generate, based upon one or more of the header field values of the packet, one or more Bloom filter keys, and query a plurality of Bloom filters, using the one or more generated Bloom filter keys, to generate a set of candidate servers of the plurality of servers. Each of the plurality of Bloom filters is to indicate whether a corresponding one of the plurality of servers is to be included in the generated set of candidate servers. The candidate filtering module is coupled to the candidate generation module and is configured to, for each of the generated sets of candidate servers that include a plurality of servers for a packet of a flow, identify, based upon one or more of the header field values of the packet, whether an entry of a false positive table exists for the flow. The false positive table is to include entries corresponding to flows of packets. The entries include server identifiers indicating which candidate servers will be falsely included in the sets of candidate servers generated by the plurality of Bloom filters for the respective flow of packets. The candidate filtering module, for each of the generated sets of candidate servers that include the plurality of servers for a packet of a flow, is also configured to remove, when an entry of the false positive table exists for the flow, from the set of candidate servers those servers identified by the server identifiers of the entry. The transmission module is coupled to the set of network interfaces and is configured to cause the packets to be transmitted to the plurality of servers based upon the respective sets of candidate servers.

In an embodiment of the invention, a method in a computing device for locality sensitive load balancing between a plurality of servers is described. The method includes receiving a packet at a network interface of the computing device. The packet includes a plurality of header field values. The method further includes querying a plurality of Bloom filters, using one or more keys based upon one or more of the plurality of header field values of the packet, to generate a set of candidate servers including a first server and a second server. Each of the plurality of Bloom filters indicates whether a corresponding one of the plurality of servers is to be included in the set of candidate servers. The second server is included in the set of candidate servers due to a respective one of the plurality of Bloom filters falsely indicating that the packet is to be destined to the second server. The method further includes identifying the first server as a destination for the packet based upon identifying a server identifier of the second server within an entry of a false positive table. The false positive table includes one or more entries, wherein each of the one or more entries identifies, for a respective flow of packets, servers that are falsely included in sets of candidate servers generated by the plurality of Bloom filters for packets of the flow. The method also includes transmitting the packet to the first server.

According to an embodiment of the invention, a non-transitory computer-readable storage medium is described that includes instructions, that when executed by a processor of a computing device, cause the computing device to implement locality sensitive load balancing between a plurality of servers by performing operations. The operations include receiving a packet at a network interface of the computing device. The packet includes a plurality of header field values. The operations further include querying a plurality of Bloom filters, using one or more keys based upon one or more of the plurality of header field values of the packet, to generate a set of candidate servers including a first server and a second server. Each of the plurality of Bloom filters indicates whether a corresponding one of the plurality of servers is to be included in the set of candidate servers. The second server is included in the set of candidate servers due to a respective one of the plurality of Bloom filters falsely indicating that the packet is to be destined to the second server. The operations further include identifying the first server as a destination for the packet based upon identifying a server identifier of the second server within an entry of a false positive table. The false positive table includes one or more entries, wherein each of the one or more entries identifies, for a respective flow of packets, servers that are falsely included in sets of candidate servers generated by the plurality of Bloom filters for packets of the flow. The operations also include transmitting the packet to the first server.

Embodiments of the invention provide fast and efficient per-flow load balancing with an exponential reduction in a load balancer's required mapping table size. Embodiments can provide near-perfect load balancing with a tremendously small or even non-existent error rate (where a packet is mistakenly routed to an incorrect destination server). Further, embodiments of the invention support easy flow re-assignment for load adjustment on the load balancer through a set of simple operations.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
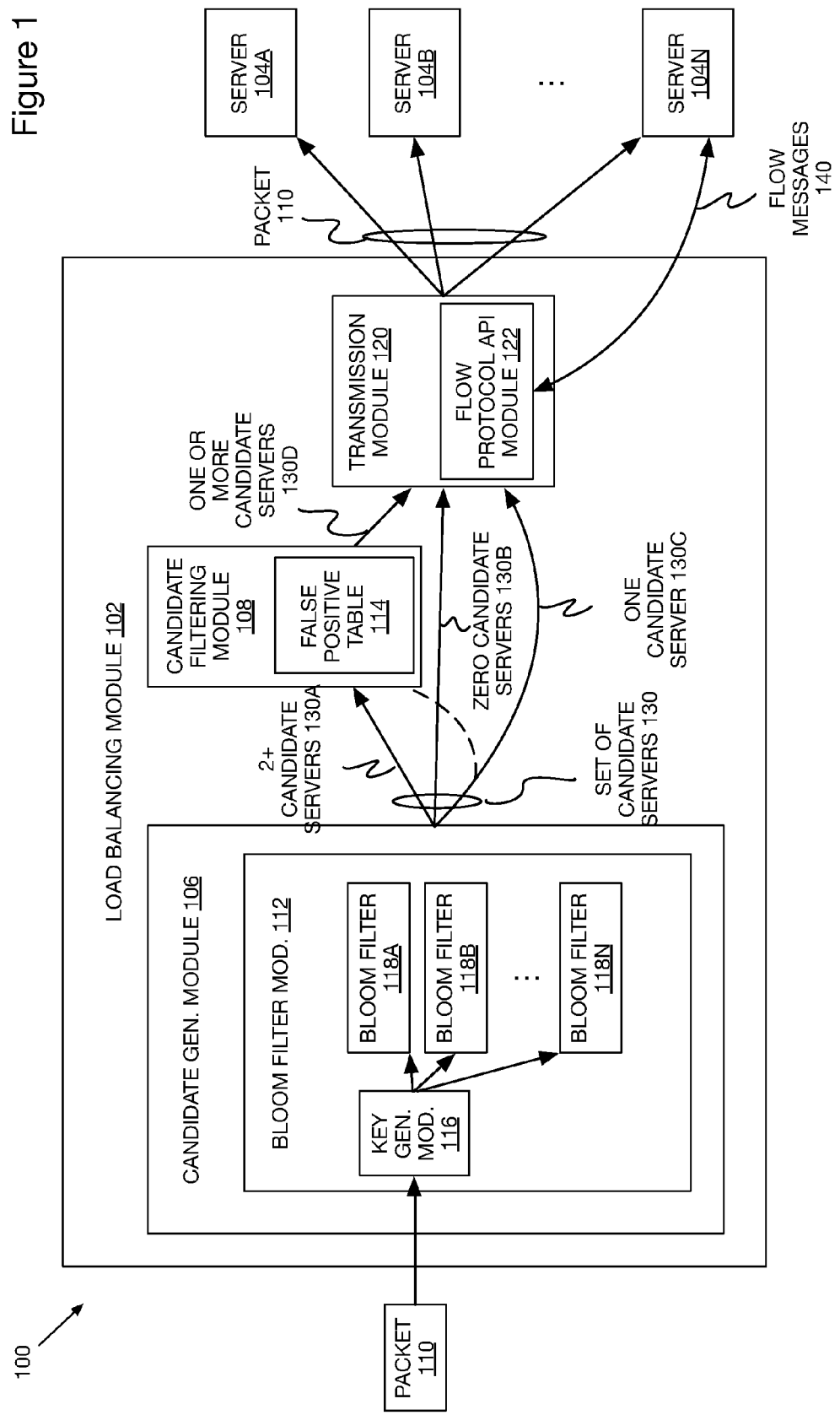
FIG. 1 illustrates a block diagram of a load balancing module of a computing device configured to perform locality sensitive hash-based load balancing of packets between a plurality of servers according to an embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device or computing device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable storage medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge, load balancer) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data.

Typically, a network device includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services). By way of example, a service card may be used to terminate IP security (IPsec) tunnels and execute the attendant authentication and encryption algorithms.

A Bloom filter is a space-efficient data structure that can be used to test whether an element is a member of a set. Bloom filters are probabilistic data structures, meaning that false positive matches are possible (i.e., incorrectly reporting than an element is a member of the set when it is not in fact a member of the set), but false negatives are not (i.e., incorrectly reporting that an element is not a member of a set when it is actually a member of the set). Thus, Bloom filters can report whether the element is definitely not a member of the set or possibly a member of the set.

A Bloom filter includes a hash function (or, a set of hash functions or other transform functions) and a base data structure named a bit vector. To add a value to a set using the Bloom filter, the value is hashed (using the hash function(s) for the Bloom filter) to generate one or more hashed values, each of which indexes exactly one of the locations in the bit vector. These indexed locations are set to '1'. To test whether a value is in the set, the value is hashed (using the hash function(s) for the filter) to generate hashed values. If any of the locations indexed by the hashed values is a '0', then it is certain that the value is definitely not in the set. However, if all of the bit locations indexed by the hashed values is a '1', the value is determined to possibly be a member of the set. This possible-membership outcome arises because two (or more) values, when hashed by the hash functions, could both index to common locations in the bit vector. Thus, instead of knowing that a tested value caused a bit location to be set, a different value previously added to the Bloom filter could have caused that particular bit location to be set.

The probabilistic nature of Bloom filters typically eliminates the possibility of their use in scenarios where false positives create problems. Thus, although Bloom filters have been used for search space reduction in various network data path algorithms, these implementations are limited to fault-tolerant configurations. For example, some systems exist that utilize the search space reduction properties of Bloom filters for flow load balancing. However, these systems only handle load balancing across links (or interfaces on a network element such as a router/switch). Thus, in such systems the existence of Bloom filter false positives can only lead to incorrect load balancing (i.e., a skewed load distribution), and will not result in packets being directed to incorrect destinations or being dropped, as would occur if these systems were used for server load balancing. For example, in network load balancers, where the Bloom filter "sprays" packets on one of N equal cost paths, a false positive result from the filter will only cause a packet/flow to be assigned to an incorrect one of these paths, which is not problematic since the packets will still reach the right server. Bloom filters have also been used to reduce the search space for determining if a packet arriving on a flow is on an unknown flow or an already mapped flow. However, this approach is prone to the inaccuracies of hashing and the drawbacks of false positives inherent to Bloom filters. A common feature of all such systems is that they do not attempt to handle the probabilistic nature of Bloom filters, and instead require that it is acceptable for the filter to report false positives and thus result in incorrect forwarding decisions being made.

However, in the case of either Software Defined Networking (SDN)/OpenFlow or Server Load Balancing, an incorrect decision by a Bloom filter will result in the packet being sent to a wrong destination (on an incorrect path or to an incorrect server), which can cause the flow to get dropped, state inconsistency to develop between the servers, and/or sensitive or otherwise confidential data to be unintentionally "leaked" outside of a defined system or route. Thus, Bloom filters have not been used in these environments.

Accordingly, a method and apparatus for locality sensitive load balancing between a plurality of servers is described herein. For the purposes of this disclosure, the term "server" is used herein to refer to a particular element servicing or terminating traffic of a flow. For example, a server may serve as an endpoint, destination, or next hop for traffic of the flow, and the flow may include one or more packets, signals, requests, programs, or commands. Thus, although the term "server" may refer to a well-known server application such as a web server (e.g., a Hypertext Transfer Protocol (HTTP) server) or web application server, file server, database server, deep packet inspection (DPI) module, or other server application, the term "server" may also refer to a piece of hardware (or combination of hardware and software) such as a processor, services card, storage device (e.g., a disk, memory), network interface, bus, computing device, or other physical resource.

In embodiments of the invention, Bloom filters are used together with a new data structure called a false positive table (FPT), which provides deterministic behavior while allowing the scale and benefits as provided by Bloom filters, including an exponential reduction in a load balancer's required mapping table size. The false positive table, which is used to eliminate false positives generated by Bloom filters, negates the impact of Bloom filter false positives drastically. With this reduction of necessary state and the negation of false positives, embodiments of the invention are able to provide near perfect load balancing. Additionally, flow re-assignment for load adjustment can be accomplished easily on a load balancer by performing simple operations on the Bloom filter and the false positive table. Further, embodiments do not mandate the knowledge of the Bloom filters by the servers, and the sizes of the tables in the load balancer can be adjusted as a balance of available look-up table size and the computational capability of the packet-processing unit.

According to embodiments of the invention, a computing device maintains a plurality of Bloom filters, each of which is associated with a corresponding server. Each Bloom filter is queried using one or more of a plurality of header field values of a received packet (and perhaps other values as well), and is used to indicate whether a corresponding one of the plurality of servers is to be included in a set of candidate servers. The false positive table includes entries that, for a particular flow, include any server identifiers that are known to be falsely included in sets of candidate servers generated by the Bloom filters for that flow. When a generated set of candidate servers for a packet includes more than one server identifier—and thus one or more of the Bloom filters is reporting a false positive—the server identifier of the "correct" server can be identified by selecting the server identifier in the set of candidate servers that does not exist within the server identifiers within the false positive table entry for that flow. Then, the packet can be transmitted to the correct server.

Flexibly, each Bloom filter may use a same set of hash functions, such as a hardware-implemented cryptographic hash functions, which allows the use of the Bloom filters to be very fast and power efficient. Additionally, instead of maintaining flow state for potentially hundreds of thousands (or more) of flows, embodiments of the invention instead utilize small Bloom filters (i.e., small bit vectors) for each possible target server and a false positive table that similarly requires relatively little storage space. Also, embodiments of the invention may be implemented completely in hardware, completely in software, or a combination of both.

Embodiments of the invention utilize a simple protocol between the servers and the load balancer to allow for the adjustment of the flow assignments to the servers. This protocol helps smooth flow assignment and re-assignment situations and also mitigates server state inconsistency. Moreover, the implementation of embodiments of the invention is flexible in the sense that there are no mandatory minimum requirements for processing power and/or memory, and thus, for example, embodiments of the invention can be tuned based on the available processing and memory (e.g., Ternary Content Addressable Memory (TCAM) resources).

FIG. 1 illustrates a block diagram 100 of a load balancing module 102 of a computing device configured to perform locality sensitive hash-based load balancing of packets 110 between a plurality of servers 104 according to an embodiment of the invention.

The load balancing module 102, upon receipt of a packet 110 of a flow, is tasked with determining which server (e.g. of the plurality of servers 104) is the proper recipient of packets belonging to that flow. To perform this task, the load balancing module 102 utilizes a candidate generation module 112 to determine a set of candidate servers 130, and possibly a candidate filtering module 108 to remove false positive candidate servers from the set of candidate servers 130 (using a false positive table 114) to thereby identify the proper server. The depicted load balancing module 102 also utilizes a transmission module 120 to transmit packets (e.g., packet 110) to one or more of the plurality of servers 104, which may include a Flow Protocol Application Programming Interface (API) module 122 to send and/or receive flow messages 140 with the plurality of servers 104 and/or a controller module (e.g., a network controller, not illustrated) to properly configure the Bloom filters 118 and/or the false positive table 114.

After the key generation module 116 has generated one or more keys, the keys are provided to the Bloom filters 118. In a very basic form, each Bloom filter (e.g., Bloom filter 118A) includes a bit vector (i.e., an array, B, of m elements, or B={1, . . . m}), where all of the m elements are initially set to zero. In an embodiment, each element in the bit vector is one bit in size (and thus a '0' or '1'), but in other embodiments each element is more than one bit in size. Each Bloom filter 118 maps a set of n elements (i.e., the database to be searched) to one or more elements of the Bloom filter bit vector. That is, set S, is S={X1, X2 . . . Xn} is mapped to one or more elements of B. The mapping is provided by a set of hash functions, which may be shared by all of the Bloom filters 118 or may be distinct/different at each Bloom filter 118. Thus, the number of hash functions of each Bloom filter 118 is represented by k, and then the hash function set, F, is F={H1, H2 . . . Hk} maps the n entries into B. The result, r, of these hash functions is such that 1<=r<=m. For each Xi, 1<=i<=n, the k hash functions are applied.

To add each entry to the Bloom filter 118, the element (e.g., bit) corresponding to the result of every hash function is then set in B (e.g., set to '1'). That is, the addition of n entries into the Bloom filter B is performed according to the pseudocode below:

```
void Bloom_Add (B, K) /* Adds key K into Bloom filter B. */
{
   for (j = 1; j <= k; j++) {
      r = Hj(K); /* r should be such that 1 <= r <= m */
      Set bit Br, if already not set.
   }
}
for (i = 1; i <= n; i++) {
   Bloom_Add (B, Xi);
}
```

In this scenario, since n is much larger than m, there is a likelihood of collision across hash functions for the same Xi and also across different Xi's, which can lead to a false positive when a key is searched against the Bloom filter.

The procedure for searching for a key K in a Bloom filter B is performed is performed according to the pseudocode below:

```
boolean Bloom_Search (B, K)
{
   for (j = 1; j <= k; j++) {
      r = Hj (K);
      if (bit Br is not set) {
         return (FALSE).
      }
   }
```

```
   return (TRUE);
}
```

In the function Bloom_Search( ), the bit set corresponding to K is obtained as below. First, Set G={Hj(K), where 1<=j<=k}. That is, the same set of hash functions are applied on K too. If any of the bit vector elements corresponding to elements in G is not set in B, then the key does not exist in the set S. This is deterministic, i.e., there cannot be false negatives, which is a fundamental property of Bloom filters. If all bit vector elements corresponding to elements in G are set in B, then Key K may exist in set S (a true positive scenario) or may not exist in set S (a false positive scenario). Generally, fewer than 10 elements in the bit vector are required to achieve a less than 1% false positive probability, independent of the size or the number of elements in the set. The false match probability can be reduced by increasing the number of hash functions (n) or by increasing the number of elements (k) over which the match occurs.

Bloom filters using bit vectors with one bit for each element do not allow for deletions. This is because one bit may represent multiple entries and resetting the bit to delete just one entry would incorrectly delete all such entries. Thus, some embodiments of the invention utilize more than one bit for each element in the bit vector, which is referred to herein as a "counting" Bloom filter. In embodiments of the invention using counting Bloom filters, the size of each Bloom filter, B, would be size=(m*t) bits where t is the number of bits used for maintaining a counter (e.g., t=2 bits to allow counting from 0-3, t=4 bits to allow counting from 0-15, t=8 bits to allow counting from 0-255, t=16 bits to allow counting from 0-65,535, etc.). Thus, to remove an entry from a counting Bloom filter, the relevant bit locations in the bit vector for that element are decremented by 1. Accordingly, a counting Bloom filter is analogous to a counting semaphore, as opposed to a traditional Bloom filter being analogous to a mutex.

According to an embodiment of the invention, the load balancing module 102 first performs an initialization by causing the bloom filter module 112 to initialize all elements of the bloom filters 118A-118N to '0', and by causing the candidate filtering module 108 to initialize the false positive table 114 to be empty (i.e., remove or invalidate all entries of the false positive table 114). The load balancing module 102 is then ready for operation.

From a high level, upon receipt of a packet, the load balancing module 102 searches the plurality of Bloom filters 118A-118N to identify a set of candidate servers, and filters from that set any servers that exist within the false positive table 114 for the flow the packet belongs to, which eliminates any false positive matches generated by the plurality of Bloom filters 118A-118N and thereby uniquely identifies the correct server as the destination for the packet.

For example, when the load balancing module 102 first receives a packet 110, the candidate generation module 112 utilizes the Bloom filter module 112 to search the plurality of Bloom filters 118A-118N. To this end, the Bloom filter module 112 utilizes a key generation module 116 to generate one or more keys to be used with the plurality of Bloom filters 118.

In an embodiment, the key generation module 116 parses the packet 110 to identify packet header field values of the packet 110, or accesses packet header field values that have been previously identified at an earlier stage of packet processing. For example, in an embodiment of the invention, the key generation module 116 identifies the 5-tuple of packet header field values, but in other embodiments more, fewer, and/or different packet header field values are identified, such as those values from packet header fields used by the OpenFlow protocol.

From the identified packet header field values, the key generation module 116 generates one or more keys to be used to query the plurality of Bloom filters 118. In an embodiment, the key generation module 116 concatenates the identified packet header field values together to form the key (or a portion of the key), but in other embodiments a key may be generated using other well-known techniques, including but not limited to performing a series of one or more bitwise operations (e.g., AND, OR, XOR, NOR) with the identified packet header field values, or applying a hash function to one or more of the identified packet header field values.

In some embodiments where each of the Bloom filters 118 uses a different set of hash functions, the key generation module 116 generates just one key to be used by all of the Bloom filters 118, although this is not a requirement. In an embodiment where each of the Bloom filters 118 uses a same set of hash functions, the key generation module 116 generates a different key for each Bloom filter 118. For example, the key generation module 116 can generate a key for each of the Bloom filters 118 by concatenating each of the identified packet header field values together, and concatenating to this value a unique identifier of a particular server (e.g., a slot identifier of a hardware card, a hostname, a value—integer, hexadecimal, string, etc.—associated with or otherwise assigned to that server). In embodiments of the invention, the key generation module 116 is configured such that packets belonging to a same flow will all generate a same key or set of keys.

Using the generated key or keys, each of the Bloom filters 118 are searched (in serial, in parallel, or some in serial and some in parallel), and zero, one, or more than one Bloom filter 118 will report a "hit" to indicate that the associated server is to be the destination for the packet. Of course, due to the nature of Bloom filters, each hit may be legitimate (a true positive) or illegitimate (a false positive). Thus, three types of scenarios may arise.

Scenario 1:

An arrived packet does not match any Bloom Filter, and thus the candidate generation module 106 generates a set of zero candidate servers 130B. Since Bloom Filters cannot have false positives, it is certain that the packet can only belong to a new flow as it cannot belong to any already assigned flow. Since the false positive probability is very low with Bloom filters, packets arriving on new flows typically lead to this scenario.

In an embodiment of the invention, a generated set of candidate servers 130 that is empty will cause the transmission module 120 to transmit the packet 110 to one or more of the servers 104A-104N in the system. For example, in an embodiment such a packet 110 is broadcast to all of the servers 104A-104N in the system, and then the server (e.g., server 104A) that "owns" or is to own packets of that flow will transmit, to the Flow Protocol API module 122 of the load balancing module 102, one or more flow messages 140 (e.g., "flow ownership messages") indicating such ownership. All of the other servers receiving the broadcast packet 110 that are not an owner of the packet 110 may simply drop the packet 110.

In some embodiments, the packet 110 is not broadcast to the servers 104A-104N by the transmission module 120 in its original form. Instead, the transmission module 120 may send the packet along with other information according to a flow ownership API protocol. This other information may include a flow status flag indicating that the packet transmitted therewith belongs to an unknown (or non-assigned, "new") flow, and that the load balancing module 102 seeks a response indicating which of the servers 104 is the assigned server. In some embodiments, the entire packet is not transmitted to the servers 104; instead, only relevant protocol header field values (e.g., the IP 5-tuple) are transmitted to allow the servers 104 to determine the owner of such packets, but not any packet data (i.e., from the packet payload) that might be sensitive or confidential.

Moreover, in some embodiments the packet 110 is sent to a subset of the servers 104. For example, one server (e.g., server 104A) may be selected (per configuration, or random selection) to receive all such "zero candidate server" packets. This server 104A may be configured to determine on its own which server is (or should be) the proper owner, or the server may communicate with the other servers (e.g., servers 104B-104N) for the same purpose. Then, either the initial server 104A or another of the servers 104B-104N will transmit a flow ownership message to the flow protocol API module 122 indicating which of the servers 104A-104N is the owner of packets of the flow. The flow ownership message may include one or more packet header field values (e.g., the 5-tuple) of the packet and may also identify the transmitting server (e.g., a source IP address, hostname, unique identifier).

Upon receipt of a flow ownership message (e.g., 140), the load balancing module 102 will determine which server (e.g., 104A) of the servers 104A-104N is the owner, and update the Bloom filter (e.g., 118A) associated with that server 104A by adding the server to the Bloom filter 118A. In an embodiment, the bloom filter module 112 will perform the "Bloom_Add" routine described above by generating a key for the packet based upon packet header field values of the packet (e.g., concatenating the 5-tuple with a server identifier of the owning server), hashing the key with the respective set of one or more hash functions to generate a hash result, and update (e.g., increment, or set) the respective Bloom filter bit vector elements according to the hash result. Upon receipt of another packet of the same flow, that Bloom filter 118A (assuming no other intervening state changes at any of the Bloom filters 118) will generate a "hit" and thus identify a set of candidate servers 130 including the one, correct candidate server 130C.

Scenario 2:

An arrived packet matches only one Bloom Filter, and thus the candidate generation module 106 generates a set including exactly one candidate server 130C. In this scenario, the packet 110 might belong to a flow already assigned to server, or it potentially might belong to a new flow (due to false positive match being reported by one of the Bloom filters 118).

Since the false positive probability of Bloom filters is known to be extremely low, the packet 110 likely belongs to a flow assigned to the server (e.g., 104B) associated with the particular Bloom filter (e.g., 118B). Thus, in an embodiment, when one candidate server 130C is identified, the transmission module 120 is configured to transmit the packet 110 to that server. Thus, in embodiments where the speed of processing is more important than heightened security (i.e., the risk of a packet being improperly sent to a wrong server), this processing path may be chosen. In such embodiments, if the recipient server is not the true owner of the packet 110, it may be configured to a send a flow message 140 to the load balancing module 102 indicating that it does not "own" the packet 110, or drop the packet, or send flow messages 140 to other servers 104B-104N to invite the true owner of the packet 110 to claim ownership (e.g., by itself sending a flow ownership message 140 back to the load balancing module 102).

However, in some embodiments where security is of primary importance, when one candidate server 130C is generated, the processing path may be configured to follow the same path as when two or more candidate servers 130A are generated, and thus the set of candidate servers 130 may be verified using the false positive table 114. This configuration presents a security optimization, which eliminates the possibility of sending the packet 110 to an incorrect server as it includes the false positive filtering protections provided by the use of the false positive table 114. Accordingly, the candidate filtering module 108—using the false positive table 114—may remove the one candidate server from the set of candidate servers 130 to cause the transmission module 120 to broadcast the packet (or otherwise notify the servers 104 of the packet, as described above with respect to Scenario 1), or it may verify that the one candidate server is the proper recipient of the packet and cause the transmission module 120 to just send it to that server.

Scenario 3:

An arrived packet matches more than one of the Bloom filters 118, and thus the candidate generation module 106 generates two or more candidate servers 130A in the set of candidate servers 130. Scenario 3 is of lower probability than Scenario 2. Here, even if it can be considered that the packet belongs to an already assigned flow (due to the higher possibility as in the case of Scenario 2) it cannot be determined which one of the matched servers the packet is assigned to. For example, if the packet 110 matches the Bloom filters 118A, 118B, and 118C, it is possible that the packet 110 belongs to a completely new flow and matching of all three filters is due to false positives. Alternatively, the flow might have been already assigned to one server (e.g., server 104B) associated with Bloom filter 118B and is matching Bloom filter 118A and Bloom filter 118C due to false positives.

In some embodiments, because the load balancing module 102 cannot decide on flow ownership with any degree of certainty in Scenario 3, the packet 110 is broadcast to all servers 104 to let the servers 104 decide on flow ownership. However, when the generated set of candidate servers 130 has more than one candidate server and if the flow is actually assigned to a server, there is unnecessary delay and consumption of resources in the broadcast of these packets, which continues throughout the life of the flow (unless Bloom Filter bit vector elements change due to other flow additions or deletions).

Accordingly, in preferred embodiments of the invention, when the set of candidate servers 130 includes two or more candidate servers 130A, a candidate filtering module 108 is used to filter, from the two or more candidate servers 130A, any servers that are known to be included as false positives using the false positive table 114. The false positive table 114, according to an embodiment of the invention, includes one or more entries identifying those servers that will be falsely included in a set of candidate servers 130 due to its associated Bloom filter falsely indicating a hit. The false positive table, in an embodiment, includes a key comprising a flow identifier of the flow of the packet (e.g., the 5-tuple of the packet) and a set of one or more server identifiers indicating those servers that will be falsely included in the sets of candidate servers 130 for packets of the flow.

For example, when a flow is assigned to server 104B yet the plurality of Bloom filters 112 indicate matches at Bloom filters 118B, 118C, and 118D, the matching of Bloom filters 118C and 118D is due to false positives. Accordingly, an entry in the false positive table (FPT) 114 may include as a key a 5-tuple of the flow, and a payload including server identifiers for both server 104C and server 104D. When the Bloom filter module 112 generates a set of candidate servers 130 including three candidate servers 130A (i.e., including server identifiers for servers 104B, 104B, and 104C), the candidate filtering module 108 searches the false positive table 114 for an entry including a key (e.g., 5-tuple) matching the relevant portions of the packet 110. Upon identifying the entry, which includes as the payload server identifiers for both server 104C and server 104D, these server identifiers are eliminated from the set of candidate servers 130, and thus only the proper destination server (104B) remains in the set of one or more candidate servers 130D presented to the transmission module 120.

If, after searching the false positive table 114 and potentially eliminating candidate servers from the provided set of two or more candidate servers 130A, there remains more than one candidate server 130D, the transmission module 120 is configured to, in various embodiments, broadcast the packet 110 to all of the servers 104 (or to a subset of the servers, as described above) to attempt to identify the proper destination server.

When a packet is broadcasted to the servers 104 (e.g., in both Scenarios 1 and 3), the load balancing module 102 expects a flow ownership message 140 from the flow-owning server, and thus these messages are to be sent by the owning servers as soon as possible to avoid further broadcasts for the same flow. In an embodiment, the flow ownership message includes a flow status flag indicating whether the ownership was for a new flow (e.g., Scenario 1) or for an already assigned flow (e.g., Scenario 3).

Upon receipt of a flow ownership message 140 indicating the true owner of the flow, the candidate filtering module 108 will identify which of the two or more candidate servers 130A for the flow were generated as false positives, and update (or insert) the entry of the false positive table 114 for the flow to include server identifiers of the false positive servers.

Thus, upon an arrival of a flow ownership message with a flow status flag indicates ownership for an existing flow (i.e., Scenario 2), the load balancing module 102 identifies which Bloom filters 118 match the flow, and then inserts/updates an entry of the false positive table 114 to include server identifiers for those servers that are not the owning server.

If the flow status flag of a flow ownership message indicates ownership for a new flow (i.e., Scenario 1), the load balancing module 102 adds the flow into the Bloom Filter of that server. In an embodiment, this includes performing the Bloom_Add routine as discussed earlier. In some such embodiments, the load balancing module 102 also proactively looks to identify any possible false positives at this point by searching the Bloom filters 118, and if any other Bloom filter(s) (aside from the expected Bloom server associated with the known owner server) generate a false positive, an entry of the false positive table 114 is updated/inserted to include those false positive server identifiers.

For example, suppose the true owner server of a particular flow is server 104A, and the generated set of two or more candidate servers identifies both server 104A and server 104B. In one scenario, there may be no entry of the false positive table 114 associated with the flow. After sending the packet (or packet portion) to one or more of the servers 104 and then receiving a flow ownership message back from server 104A, the candidate filtering module is configured to insert an entry into the false positive table 114 to indicate that server 104B is a false positive. This entry may include as a key the 5-tuple of the packet, and as a value a set including one server identifier for server 104B. Upon receipt of another packet belonging to the same flow, the same set of two or more candidate servers 130A is generated; however, this time the candidate filtering module 108 will identify the entry of the false positive table associated with the flow and eliminate the inclusion of server 104B from the provided set of two or more candidate servers 130A. Thus, the candidate filtering module outputs a set including one candidate server 130D for the true owner server 104A.

Now, assume another change is made to another Bloom filter 118N that causes it to falsely generate a "hit" for packets of the same flow. Thus, for the next packet of the flow, the set of two or more candidate servers 130A will include server identifiers for the true owner server 104A and also both the false positive server 104B and false positive server 104N. The candidate filtering module 108, using the entry of the false positive table 114 for the flow, will remove false positive server 104B from consideration, which leaves both the true owner server 104A and the false positive server 104N in the output set of candidate servers 130D. Again, the packet (or packet portion) will be sent to one or more of the servers 104 and again, the true owner server 104A will transmit a flow ownership message 140 back to the load balancing module 102, causing the candidate filtering module to update the entry for the flow to also include a server identifier for the false positive server 104N.

When a flow is terminated, the owning server (or another server or third-party entity) may be configured to transit a flow deletion message 140 to the load balancing module 102. In an embodiment, the flow deletion message includes a flow identifier (e.g., the 5-tuple) of the flow and a server identifier indicating from where the flow is getting deleted. When the load balancing module 102 receives a flow deletion message, in an embodiment it performs the following two actions. First, the load balancing module 102 causes the candidate filtering module to remove, from the false positive table 114, any false positive table entry existing for the flow (if there is any). Second, the load balancing module 102 causes the Bloom filter module 112 to delete the flow from the respective Bloom filter (e.g., 118A) of the associated server (e.g., 104A). In an embodiment using counting Bloom filters, the Bloom filter module 112 deletes a flow by (if necessary) generating a key for the respective Bloom filter 118A, executing the set of one or more hash functions for the Bloom filter 118A to identify a set of Bloom filter bit vector elements, and decrements each of those identified bit vector elements. In some embodiments, the load balancing module 102 only allows a deletion of a flow upon receiving a flow deletion message if it has, in fact, previously received a flow ownership message, in order to maintain consistency.

Using the techniques described herein, the load balancing module 102 allows for a flow re-assignment from one server to another by performing a combination of both the flow deletion and flow addition techniques described herein.

For ease of understanding, pseudocode for a routine for processing arrived packets by a load balancing module 102 according to an embodiment is presented below.

---

Routine: Processing of an arrived packet in the load balancing module.

```
/* Candidate_Server_Set is a temporary structure that contains the list of servers whose Bloom
filters match the five tuple. */
Initialize Candidate_Server_Set to null set { }.
for (p = 1; p <= L; p++) {
    /* Create key from the packet to match the Bloom filter . */
    Kp = function_of (5-tuple in the packet, Server-id of server p);
    if (Bloom_Search(Bp, Kp)) == TRUE) {
        Candidate_Server_Set = Candidate_Server_Set + { p };
    }
}
/* Decide on packet dispatch, first verify false positives. */
Search the FPT with the 5-tuple of the flow.
If (FPT entry exists) {
    Candidate_Server_Set = Candidate_Server_Set - { List of servers ID'd in the FPT
entry }
}
if ( Candidate_Server_Set is empty OR if Candidate_Server_Set has more than 1 element) {
    /* Let the servers decide on flow assignment. */
    Broadcast the packet to all servers.
} else {
    /* There is only one entry in the server set. */
    Send the packet to the remaining server in Candidate_Server_Set.
}
```

---

First, a variable named Candidate_Server_Set, which represents the generated set of candidate servers 130, is initialized to be an empty set. Then, for each of the L Bloom filters 118, a key is generated based upon packet header field values (e.g., the IP 5-tuple) and a server identifier for the respective Bloom filter. A search of the Bloom filter is performed, and if a "hit" is found, an identifier of that server is added to the Candidate_Server_Set. Next, the false positive table is searched to identify whether a false positive table entry exists for the flow. If it does, any server identifiers from that false positive table entry are removed from the Candidate_Server_Set, which eliminates false positives that may have been generated by the Bloom filters 118. Then, if either zero or more than one server identifier is still in the Candidate_Server_Set, the packet is broadcast to all servers in the system. Alternatively, if exactly one server identifier remains, the packet is sent to that server.

Figure 2:
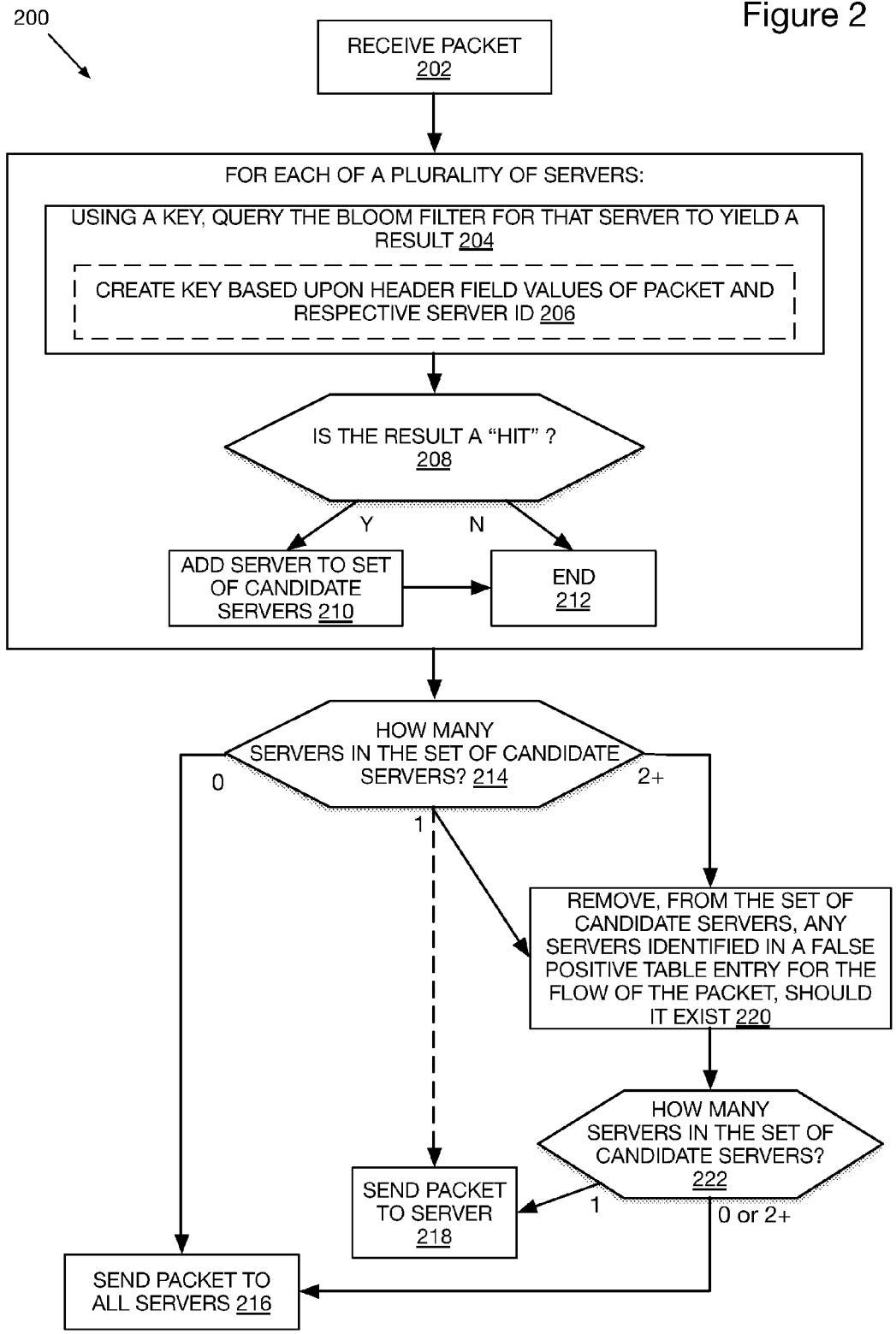
FIG. 2 illustrates a flow for performing locality sensitive hash-based load balancing of packets between a plurality of servers according to an embodiment of the invention.

FIG. 2 illustrates a flow 200 for performing locality sensitive hash-based load balancing of packets between a plurality of servers according to an embodiment of the invention. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

At block 202, a packet is received. In an embodiment, the packet is received at a physical network interface of a computing device acting as a load balancer, and needs to be directed to a particular server (of a plurality of servers) that "owns" (e.g., processes) packets belonging to a same flow.

For each of the multiple servers, the computing device maintains a respective Bloom filter. Then, for each of the plurality of servers, at block 204 the computing device queries, using a key, the Bloom filter for that server to yield a result. In an embodiment, each key is the same and each Bloom filter uses a different set of hash functions. In an embodiment, each key is different and each Bloom filter may use the same (or different) set of hash functions. In some embodiments, each key comprises one or more packet header values of the packet. In some embodiments, each key comprises a server identifier for the server associated with that particular Bloom filter. In some embodiments, as represented by optional block 206, each key is based upon both the header field values of the packet as well as a respective server identifier.

If the result is a "hit" (at block 208), the server associated with that particular Bloom filter is added to a set of candidate servers, and then this process for this server ends 212. If the result is not a "hit" (at block 208), this process for this server ends 212. Next, the overall process repeats for the rest of the Bloom filters. At this end of this initial procedure, a set of candidate servers has been generated.

The flow 200 continues in different paths depending upon how many servers are in the set of candidate servers 214. In the depicted embodiment, if no servers are in the set, the packet is sent to all servers 216, and shortly thereafter the server that is to "own" (i.e., process) packets belonging to the same flow as this packet will send back a flow ownership message to indicate such ownership. The flow ownership message may include a flow status flag indicating that this message is for a "new" flow, which causes the computing device to update the Bloom filter associated with the sending server to insert an entry for the flow.

If, instead of having 0 servers, the set of candidate servers instead includes two or more servers, the flow continues at block 220 with the computing device removing, from the set of candidate servers, those servers identified in a false positive table entry for the flow of the packet, should one exist. If only one server remains after this removal/filtering, the packet is sent to the identified server at 218. If, however, zero or two or more servers remain, the packet is broadcast to all servers at block 216. At this stage, another flow ownership message is expected from the owning server, the arrival of which may cause the computing device to update one or more Bloom filters and/or update/insert an entry of the false positive table.

In some embodiments, if the originally generated set of candidate servers includes exactly one server, the packet is immediately sent to the server 218. However, in other embodiments, processing continues at block 220 where the set of candidate servers (with only one server identifier) is subject to a filtering based upon the false positive table, which may or may not remove the server identifier from the set of candidate servers.

Figure 3:
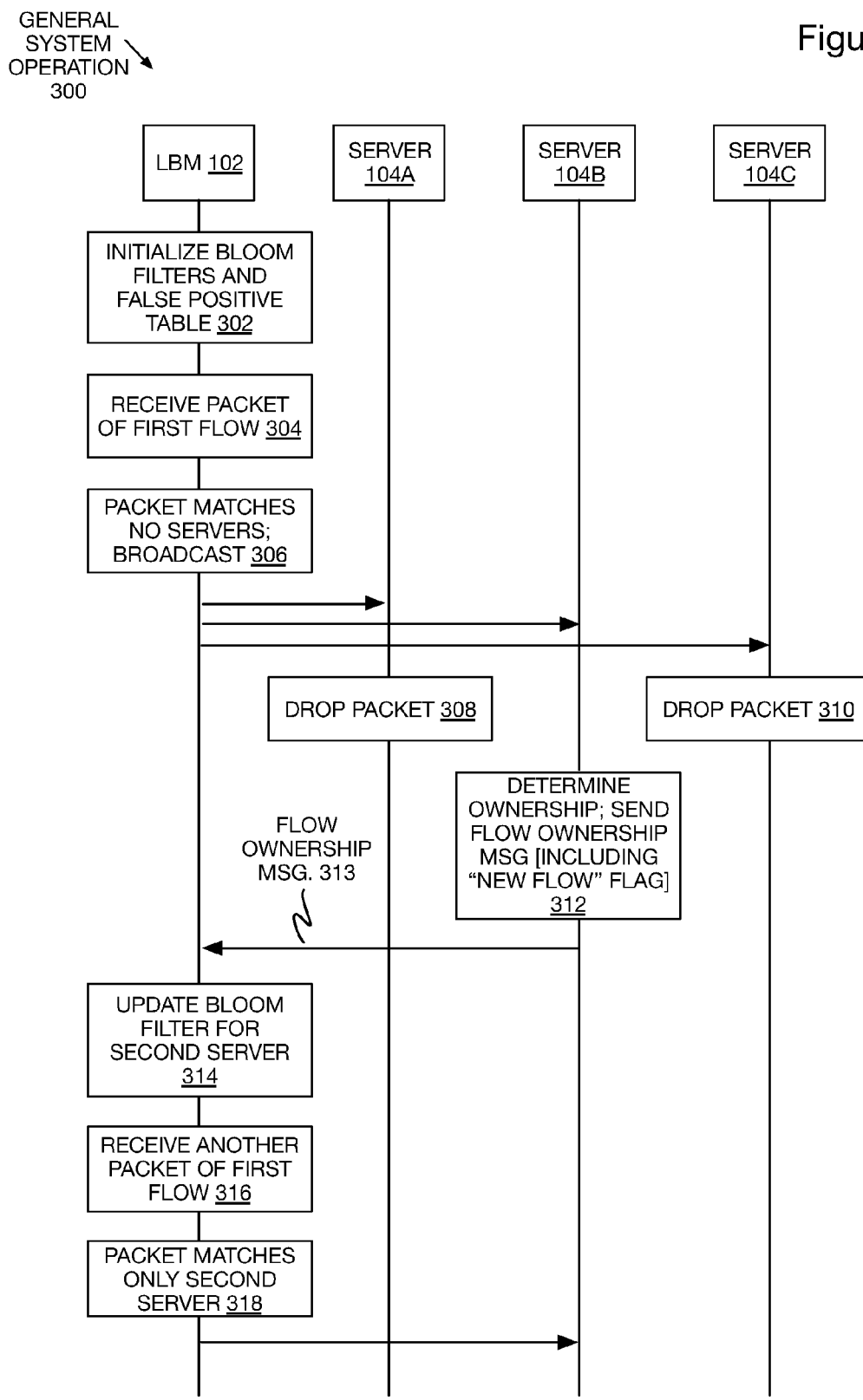
FIG. 3 illustrates a combined flow and sequence diagram for an exemplary operation of a system for performing locality sensitive hash-based load balancing of packets between a plurality of servers according to an embodiment of the invention.

FIG. 3 illustrates a combined flow and sequence diagram for an exemplary general operation 300 of a system for performing locality sensitive hash-based load balancing of packets between a plurality of servers according to an embodiment of the invention. This diagram includes four entities: the load balancing module 102, a first server 104A, a second server 104B, and a third server 104C. In some embodiments, each entity is part of a separate computing device; however, in other embodiments each entity is part of one computing device.

In this general operation 300 depiction, the load balancing module 102 first initializes 302 its Bloom filters and the false positive table. In an embodiment, this includes setting all elements of each Bloom filter to be empty (e.g., set all bit vector elements to '0') and emptying any entries in the false positive table.

After initialization, the general operation 300 includes receiving 304 a first packet belonging to a first flow, which is a new flow. Since the flow is new, the first packet matches 306 no servers (i.e., none of the Bloom filters reports a "hit") so the set of candidate servers is empty and thus the packet is broadcast to each of the three servers 104A-104C.

In this embodiment, the second server 104B is to be the "owning" server, and thus the first server 104A and the third server 104C drop the packet at blocks 308 and 310, respectively. However, the second server 104B determines its ownership of the flow, and sends a flow ownership message 313 back to the load balancing module 102. The second server 104B may make the determination of flow ownership on its own accord, or may communicate with the other servers 104A, 104C to make the determination. The flow ownership message 313 may include a flow status flag indicating that the message relates to a new flow, and also may include one or more packet header field values from that packet that serve as a flow identifier.

Upon receipt of the flow ownership message 313, the load balancing module 102 identifies the second server 104B as the sender of the message and identifies the existence of the flow status flag being set to "new flow", and thus will update 314 the Bloom filter for the second server 314 to indicate its ownership of the flow.

At block 316, the load balancing module 102 receives another packet of the first flow, and generates 318 a set of candidate servers including only the second server 104B. In some embodiments, the packet will then be immediately sent to the second server 104B, but in some embodiments the generated set of candidate servers will first be filtered against the false positive table, which may result in the one server remaining or the server being removed, which would result in the packet being broadcast to all three servers.

Figure 4:
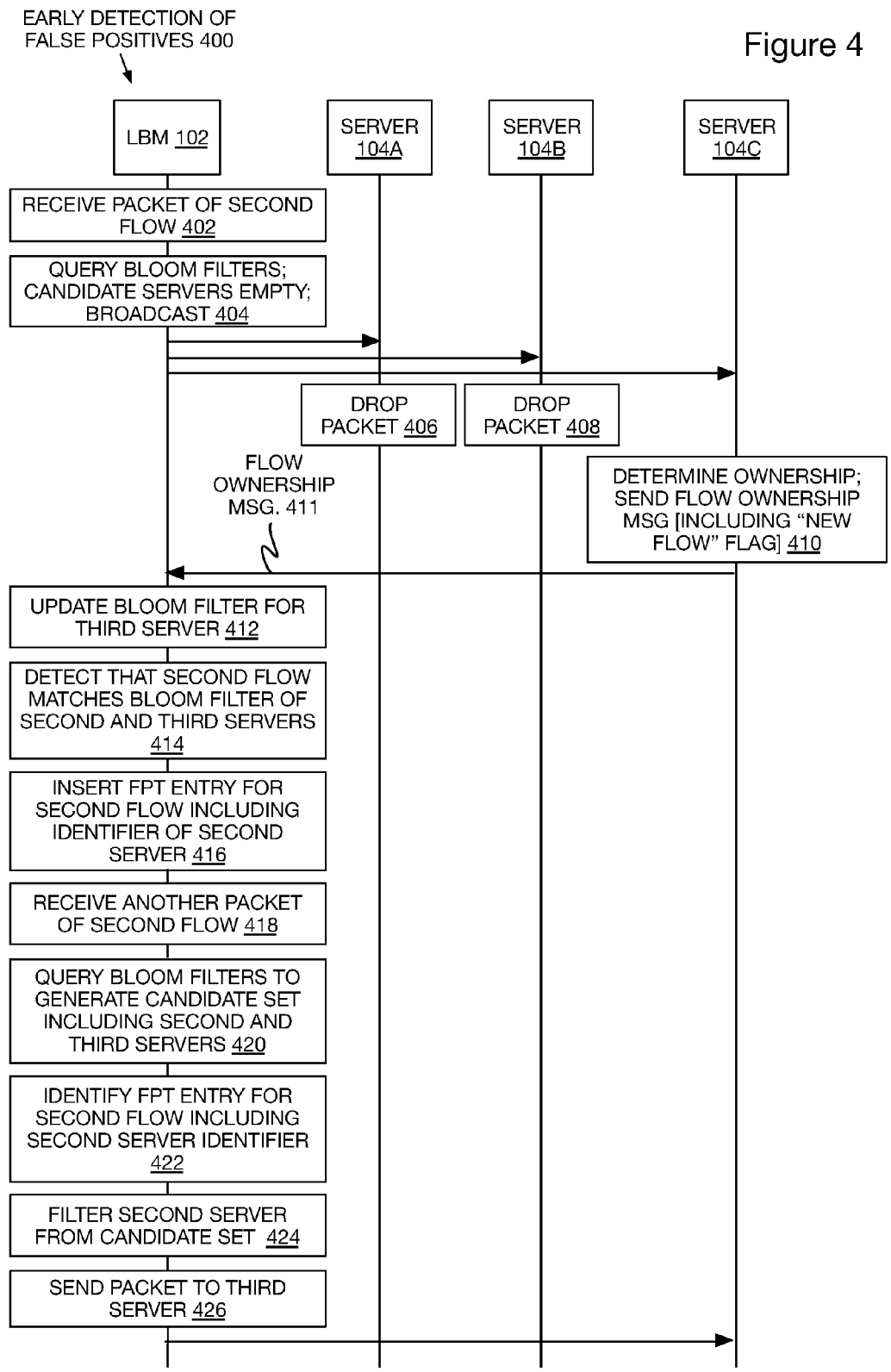
FIG. 4 illustrates a combined flow and sequence diagram for early detection of false positives when performing locality sensitive hash-based load balancing of packets between a plurality of servers according to an embodiment of the invention.

FIG. 4 illustrates a combined flow and sequence diagram for early detection of false positives 400 when performing locality sensitive hash-based load balancing of packets between a plurality of servers according to an embodiment of the invention. In this depicted scenario, the load balancing module 102 receives 402 a packet of a second flow, which is a new flow and thus the assignment of packets of the second flow to a particular one of the servers 104A-104C is unknown to the load balancing module 102. Thus, the load balancing module 102 will query 404 the plurality of Bloom filters for the servers 104A-104C, none of which will report a "hit" and thus the generated set of candidate servers is an empty set. Accordingly, the packet (or packet portion) will be broadcast to the three servers 104A-104C. In this scenario, the first server 104A and the second server 104B determine that they are not the owner of this flow, and thus will drop the packet at blocks 406 and 408.

The third server 104C, however, will determine 410 that it is to be the owner of packets of the flow and send, to the load balancing module 102, a flow ownership message 411 indicating the ownership. In some embodiments, the flow ownership message includes a flow status flag indicating that the flow is a "new" flow.

In response to receipt of the flow ownership message 411 (and in some embodiments based upon the existence of the flow status flag set to "new"), the load balancing module 102 updates 412 the Bloom filter for the third server 104C to indicate that packets of the second flow are to be processed by the third server 104C (i.e., report a "hit" when other packets belonging to the second flow are received).

In this depiction, the early detection of false positives 400 includes, at some point, detecting 414 that packets of the second flow will also match the Bloom filter of the second server (in addition to properly matching the Bloom filter of the third server). Accordingly, the load balancing module 102 is thus configured to proactively detect the existence of false positives before, possibly, any false positive "hit" is reported for packets of the second flow. Thus, responsive to the detection 414 of the false positive that would be issued by the Bloom filter of the second server, the load balancing module 102 is configured to insert 416 a false positive table entry for the second flow that includes an identifier of the second server.

Thus, at some point when the load balancing module 102 receives 418 another packet of the second flow, it will query 420 the plurality of Bloom filters and generate a set of candidate servers including the second server and the third server. Of course, the inclusion of the second server in the set of candidate servers is a false positive, and the inclusion of the third server in the set of candidate servers is a true positive. To address this problem, the load balancing module 102, then searches the false positive table to identify 422 the entry for the second flow, which includes the second server identifier. This second server identifier is filtered 424 from the set of candidate servers by the load balancing module 102. Since only the third server identifier remains in the set of candidate servers, the load balancing module 102 will then send 426 the packet to the proper recipient—the third server.

Figure 5:
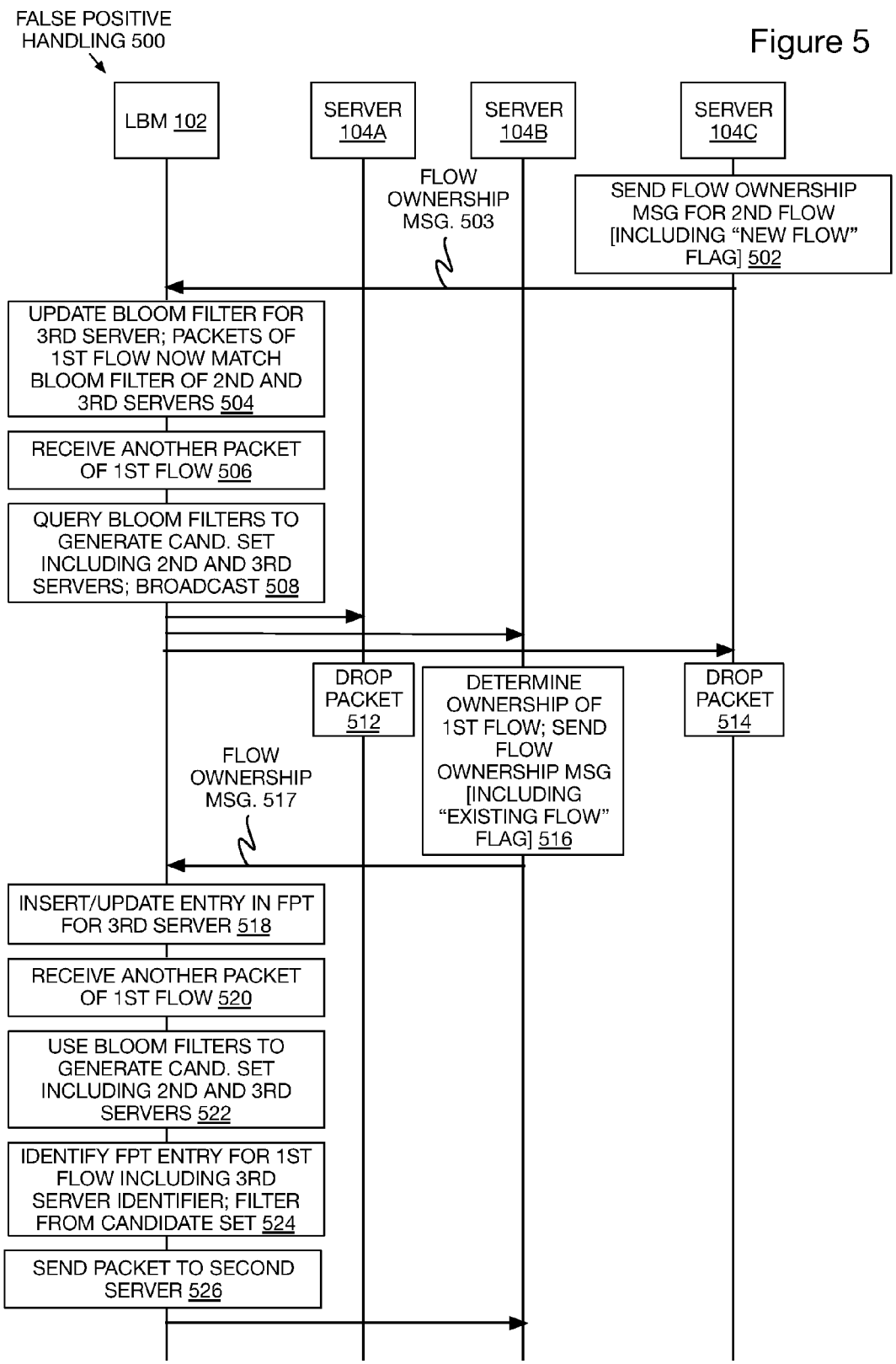
FIG. 5 illustrates a combined flow and sequence diagram for false positive handling when performing locality sensitive hash-based load balancing of packets between a plurality of servers according to an embodiment of the invention.

FIG. 5 illustrates a combined flow and sequence diagram for false positive handling 500 when performing locality sensitive hash-based load balancing of packets between a plurality of servers according to an embodiment of the invention. In this depiction, perhaps due to a packet of a new second flow being broadcast to the servers 104A-104C, the third server 104C sends 502 a flow ownership message 503 to the load balancing module 102. In an embodiment, this flow ownership message 503 includes a flow status flag indicating that the second flow is a "new" flow.

Responsive to receipt of the flow ownership message 503, the load balancing module 102 updates 504 the Bloom filter for the third server so that this Bloom filter will report a "hit" for packets of the second flow. However, as a result, packets of a first flow (e.g., the first flow presented in FIG. 3) will properly match the Bloom filter of the second server but will also incorrectly match the Bloom filter of the third server. Accordingly, the updating of the Bloom filter for the second flow inadvertently has an impact in causing false positives for packets of the first flow.

Thus, upon receiving 506 another packet of the first flow, the load balancing module 102 will query 508 the plurality of Bloom filters and generate a set of candidate servers including (correctly) the second server and (incorrectly) the third server. Supposing that no false positive table entry exists for the first flow or that if one exists, it does not include a server identifier of the third server 104C, then the packet will be broadcast to the three servers 104A-104C. The first server 104A will drop the packet 512 and similarly the third server 104C will drop the packet 514, but the second server 104B will determine 516 its ownership of the first flow and send a flow ownership message 517 to the load balancing module 102. In an embodiment, the flow ownership message 517 includes a flow status flag indicating that the first flow is an "existing flow", i.e., that the second server 104B had already been processing packets of the first flow.

Responsive to receipt of the flow ownership message 517 (and in an embodiment, based upon the flow status flag being set to "existing flow"), the load balancing module 102 will insert or update 518 an entry in the false positive table for the first flow, which includes a server identifier of the third server to indicate that it is generating false positive hits for the first flow.

Upon receipt 520, by the load balancing module 102, of another packet of the first flow, the load balancing module 102 will use 522 the plurality of Bloom filters to generate a set of candidate servers including the second and third servers, identify 524 the false positive table entry for the first flow and filter, from the set of candidate servers, the third server due to its including in the false positive table entry. Thus, the set of candidate servers will only include one element: the correct owner server, which is the second server 104B, and the packet (and subsequent packets of the same first flow) will be sent 526 to the second server 104B without the need for any broadcast of the packet(s).

Figure 6:
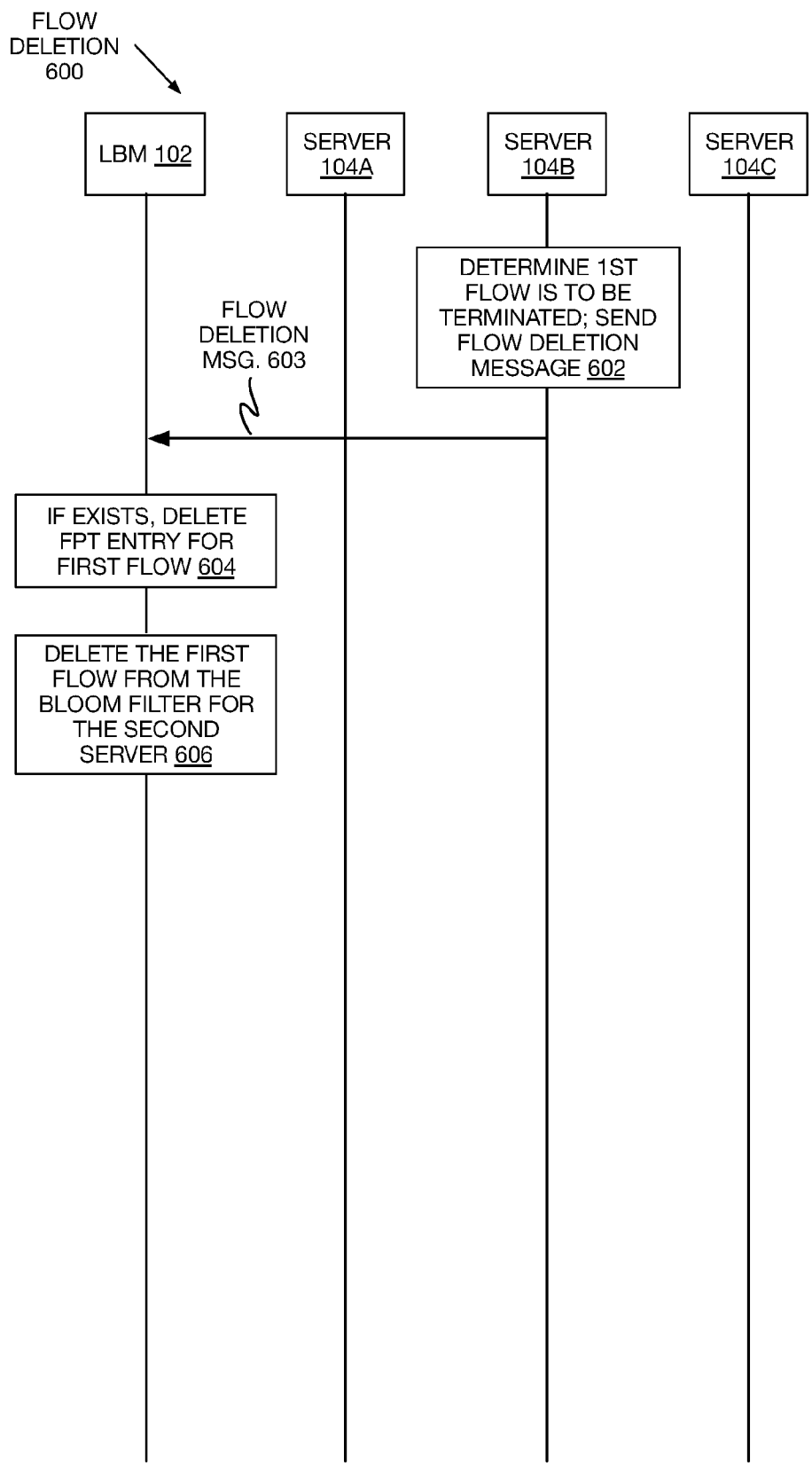
FIG. 6 illustrates a combined flow and sequence diagram for flow deletion when performing locality sensitive hash-based load balancing of packets between a plurality of servers according to an embodiment of the invention.

FIG. 6 illustrates a combined flow and sequence diagram for flow deletion 600 when performing locality sensitive hash-based load balancing of packets between a plurality of servers according to an embodiment of the invention. In this depiction, the second server 104B determines 602 that the first flow is to be (or has been) terminated, and sends a flow deletion message 603 to the load balancing module 102. In response, the load balancing module 102 will, delete 604 any existing false positive table entry for the first flow, and will also delete 606 the first flow from the Bloom filter for the second server 606, as described earlier herein.

Figure 7:
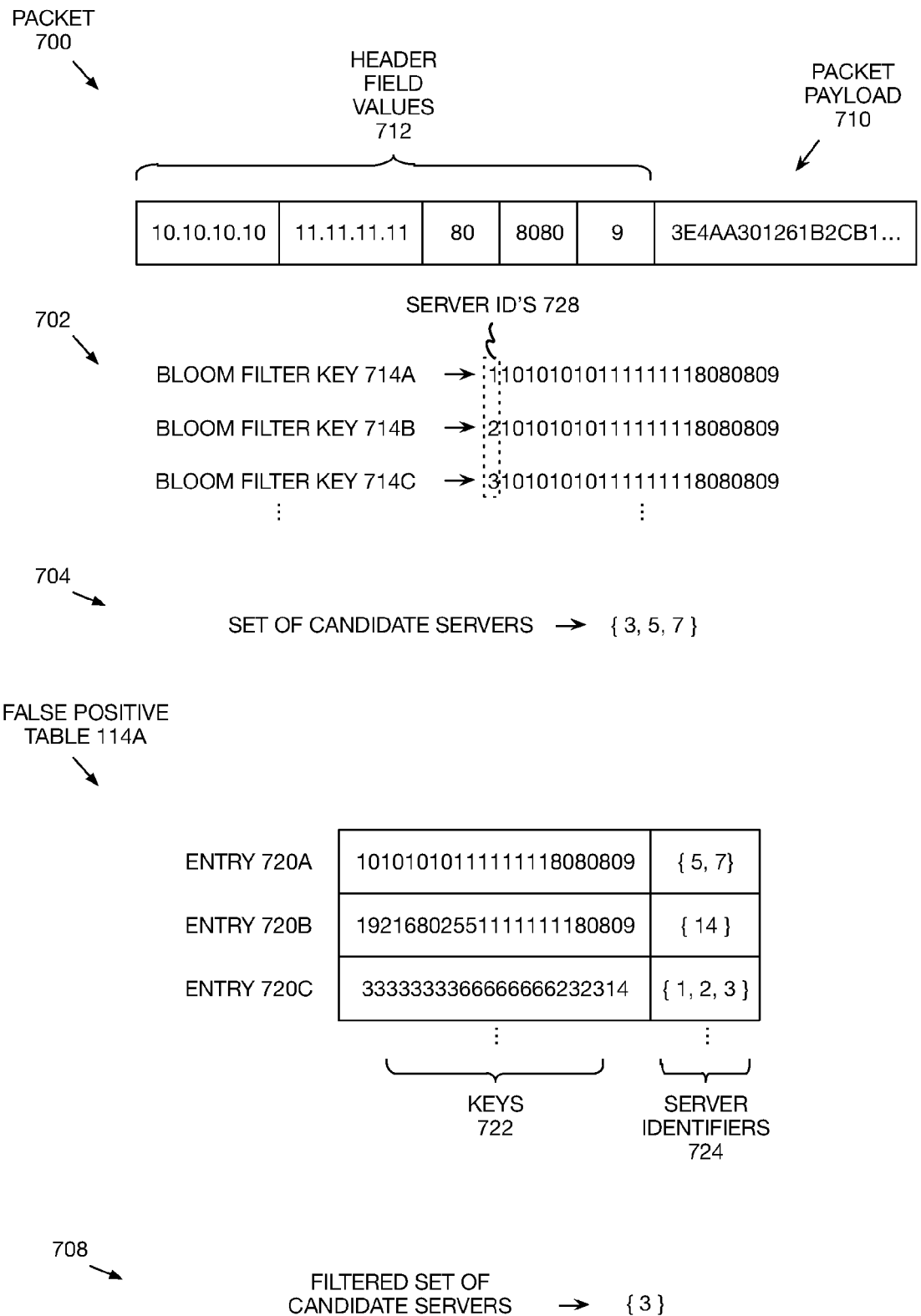
FIG. 7 illustrates a received packet belonging to a flow, a plurality of Bloom filter keys, a set of candidate servers, a false positive table, and a filtered set of candidate servers according to an embodiment of the invention.

FIG. 7 illustrates a received packet 700 belonging to a flow, a plurality of Bloom filter keys 702, a set of candidate servers 704, a false positive table 114A, and a filtered set of candidate servers 708 according to an embodiment of the invention. These entities are described herein with respect to a receipt of an example packet 700, which may or may not be representative of a typical packet in many systems. However, certain aspects of the packet 700 and the entities are not illustrated for the sake of clarity and ease of understanding. It is understood that any omitted aspects or features are identifiable and/or well-known to those of ordinary skill in the art.

In this depicted example, it is provided that a system utilizing aspects of the invention includes 10 servers. At some point, the packet 700 arrives at a load balancing module 102, which is not illustrated. The packet 700 includes a plurality of packet header fields and a plurality of packet header field values 712. In this depicted embodiment, the packet header field values 712 comprise the IP 5-tuple of a source IP address, a destination IP address, a source port, a destination port, and a protocol identifier. Of course, received packets may have (and typically do have) more, fewer, and/or different packet header fields and packet header field values—this example is simplified for the sake of clarity. The packet 700 also includes a packet payload 710, which may include application layer data.

Based upon the packet header field values 712, the load balancing module 102 generates a set of keys 702 to be used for the plurality of Bloom filters. In this embodiment, each of the set of keys 702 is different, and includes a server identifier 728 (e.g., 1, 2, 3) concatenated to the packet header field values 712 of the packet 700. Thus, in this depicted embodiment, each of the keys 714A-714C only differs at the beginning of each key due to the inclusion of the server identifier 728. Of course, in other embodiments each Bloom filter key 702 may be the same, for example when each of the Bloom filters uses a different set of hash functions.

After querying the plurality of Bloom filters (not illustrated), a set of candidate servers 704 is generated. This particular set of candidate servers 704 includes server identifiers for a third, fifth, and seventh server (i.e., '3', '5', '7').

With the plurality of candidate servers 704, the load balancing module 102 will search through entries 720A, 720B, 720C of a false positive table 114A to attempt to identify which entry, if any, exists for the flow of the packet 700. Each entry includes a key 722 (which may or may not be in a different format than any of the Bloom filter keys 702) and a set of server identifiers 724. In this example, the keys 722 are simply a concatenation of the header field values 712 (e.g., the 5-tuple). Thus, the key 722 of the first entry 720A matches the header field values 712 of the packet 700, and the server identifiers 724 of that entry are identified. This entry's 720A set of server identifiers 724 includes a server identifier for the fifth and seventh servers (e.g., '5', '7').

Using the identified set of server identifiers 724, the set of candidate servers 704 is filtered by removing any server identifiers from the identified set of server identifiers 724 to yield a filtered set of candidate servers 708. In this depicted embodiment, the filtered set of candidate servers 708 includes only a server identifier for a third server (e.g., '3') because the '5' and '7' server identifiers existed in the identified set of server identifiers 724. Thus, the load balancing module 102 has identified two generated false positives (i.e., '5' and '7') and thus can send the packet 700 to the true owner third server without needing to query any of the servers or broadcast the packet to determine the owner server.

Another different example may also be presented with respect to the elements of FIG. 7. We first assume that the load balancing module 102 receives the packet 700, and has no knowledge of the packet or its flow. Thus, the packet will be broadcast to all ten servers.

We now assume that the true owner server is server '3', which sends a flow ownership message to the load balancing module 102 with the flow status flag set to "new" flow. Thus, the load balancing module 102 will update the Bloom filter for the third server to indicate the ownership. At this point, additional packets of the flow would only be sent to the third server.

However, we now assume that the Bloom filter for server '5' changes (e.g., due to the addition of some other flow) such that packets on the flow now match this other Bloom filter. At this point, a next incoming packet on the flow is again broadcast to all 10 servers, since the set of candidate servers will include server identifiers for both the third server and the fifth server and no associated entry exists in the false positive table.

Now, the second server, upon receipt of the broadcasted packet, will again transmit a flow ownership message to the load balancing module 102, which now includes the flow status flag set to "existing flow." Upon receipt of this packet, the load balancing module 102 creates an entry in the false positive table for the flow, which includes a key 722 of a flow identifier for the flow (e.g., the 5-tuple) and a set of server identifiers 724 only including a server identifier of the fifth server.

At this point, additional packets of the flow will again only be sent to the third server despite the set of candidate servers identifying both the third and fifth servers, due to the filtering of the fifth server out of the set due to its inclusion in the respective entry in the false positive table for the flow.

However, we now assume that the Bloom filter for server '7' changes (e.g., due to the addition of some other flow) such that packets on the flow now match this other Bloom filter, too. At this point, a next incoming packet on the flow is again broadcast to all 10 servers, since the set of candidate servers will include server identifiers for the third server, the fifth server, and the seventh server, and after filtering the set using the false positive table there will still be two server identifiers (e.g., '3' and '7').

Now, the second server, upon receipt of the broadcasted packet, will again transmit a flow ownership message to the load balancing module 102, which again includes the flow status flag set to "existing flow." Upon receipt of this packet, the load balancing module 102 updates the entry in the false positive table for the flow to insert another server identifier for the seventh server into the set of server identifiers 724.

At this point, additional packets of the flow will again only be sent to the third server despite the set of candidate servers identifying the third, fifth, and seventh servers, due to the filtering of the fifth server and the seventh server out of the set due to their inclusion in the respective entry in the false positive table for the flow.

Figure 8:
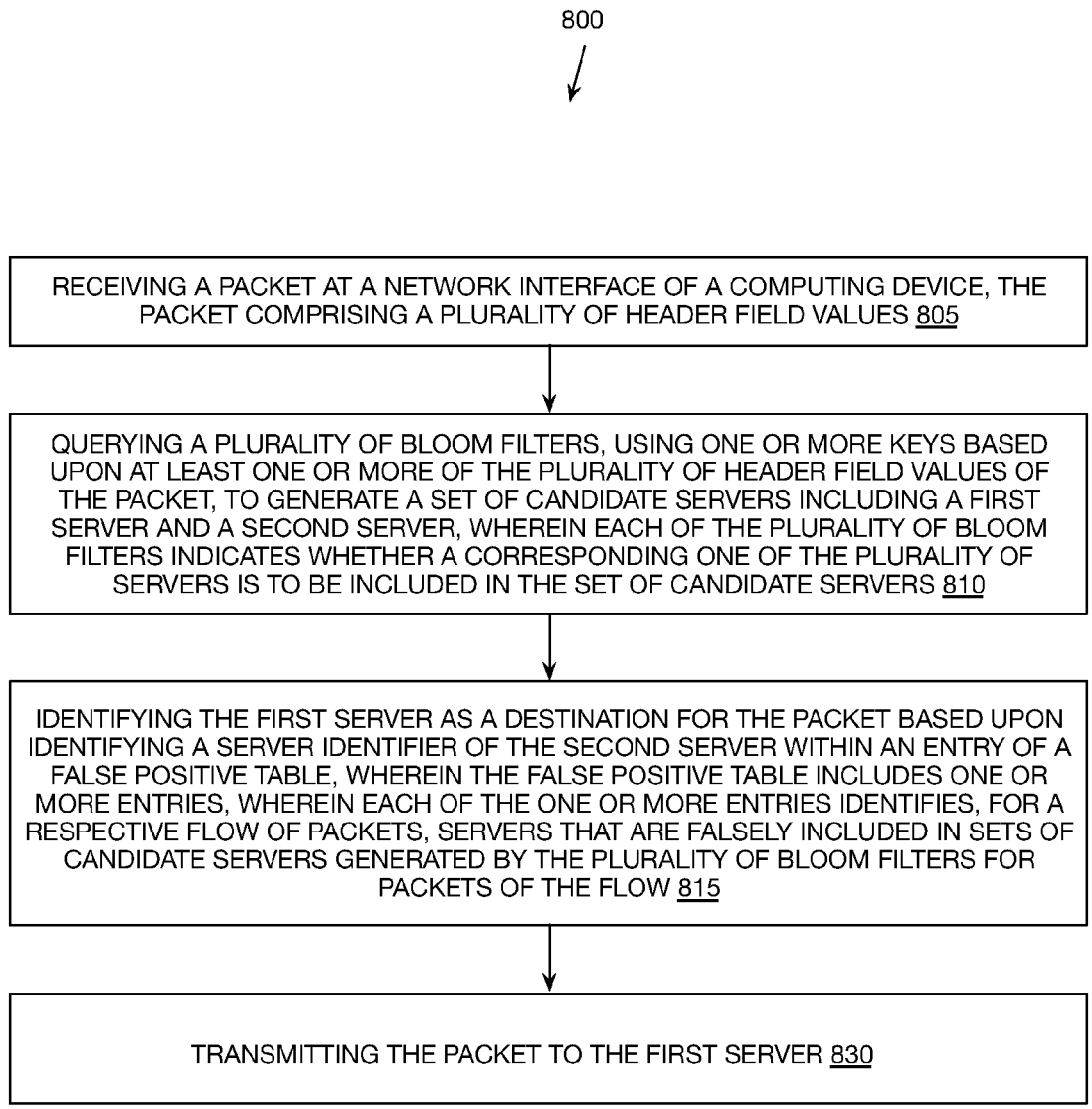
FIG. 8 illustrates another flow for performing locality sensitive hash-based load balancing of packets between a plurality of servers according to an embodiment of the invention.

FIG. 8 illustrates another flow 800 for performing locality sensitive hash-based load balancing of packets between a plurality of servers according to an embodiment of the invention. Flow 800 includes, at block 805, receiving a packet at a network interface of a computing device, which includes a plurality of header field values. The flow 800 further includes, at block 810, querying a plurality of bloom filters, using one or more keys based upon at least one or more of the plurality of header field values of the packet, to generate a set of candidate servers including a first server and a second server. Each of the plurality of bloom filters indicates whether a corresponding one of the plurality of servers is to be included in the set of candidate servers.

Next, the flow 800 includes identifying, at block 815, the first server as a destination for the packet based upon identifying a server identifier of the second server within an entry of a false positive table. The false positive table includes one or more entries. Each entry identifies, for a respective flow of packets, servers that are falsely included in sets of candidate servers generated by the plurality of bloom filters for packets of that flow. At block 830, the flow QQ0 includes transmitting the packet to the first server 830.

Figure 9:
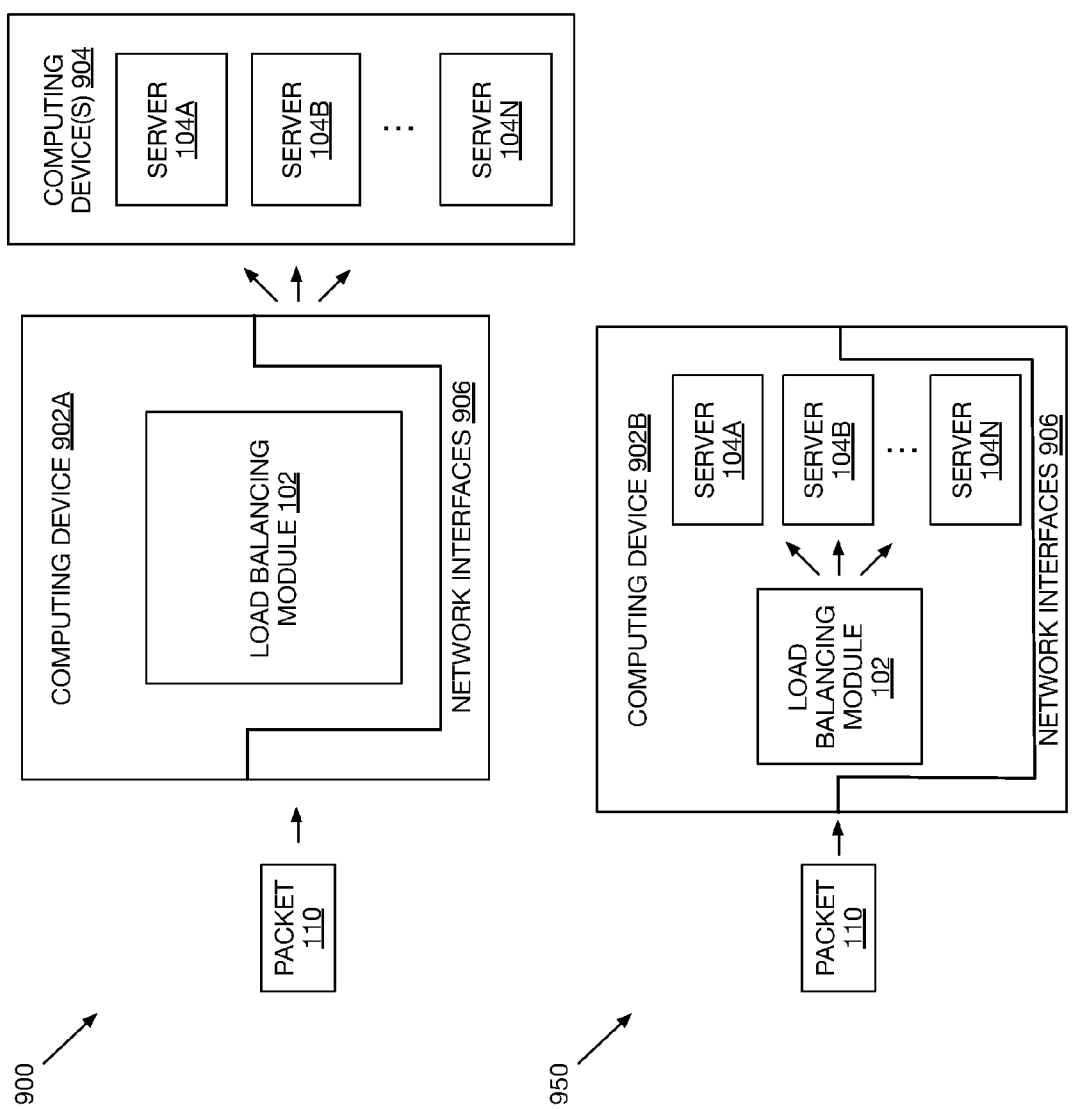
FIG. 9 illustrates block diagrams of computing devices in a system for performing locality sensitive hash-based load balancing of packets according to an embodiment of the invention.

FIG. 9 illustrates block diagrams 900, 950 of computing devices 902, 904 in a system for performing locality sensitive hash-based load balancing of packets according to an embodiment of the invention. In some embodiments, some of the computing devices 902, 904 are common off the shelf (COTS) devices such as computing devices implementing the x86 instruction set architecture (ISA). In some embodiments, some of the computing devices 902, 904 are network devices such as dedicated network devices (e.g., dedicated switches, dedicated routers), and some of the computing devices 902, 904 may include aspects of both dedicated network devices and COTS devices.

In block diagram 900, the load balancing module 102 is implemented as part of a computing device 902A that also includes a set of network interfaces 906 for connecting to a network and receiving and/or transmitting the packet 110. In this embodiment, the servers 104A-104N are implemented on one (or more) computing devices 904. Each of the computing devices 904 may implement one or more of the servers 104A-104N. One example of this embodiment includes the computing device 902A implementing a load balancer to steer the flow of packets to a plurality of server applications including, but not limited to, web servers, application servers, database servers, file servers, etc.

In block diagram 950, the load balancing module 102 is implemented as part of a computing device 902B that also includes a set of network interfaces 906 as well as the plurality of servers 104A-104N. In an embodiment, one or more of the servers 104 comprise a hardware card of the computing device, including but not limited to services cards. In some embodiments, the computing device 902B is a network device.

Figure 10:
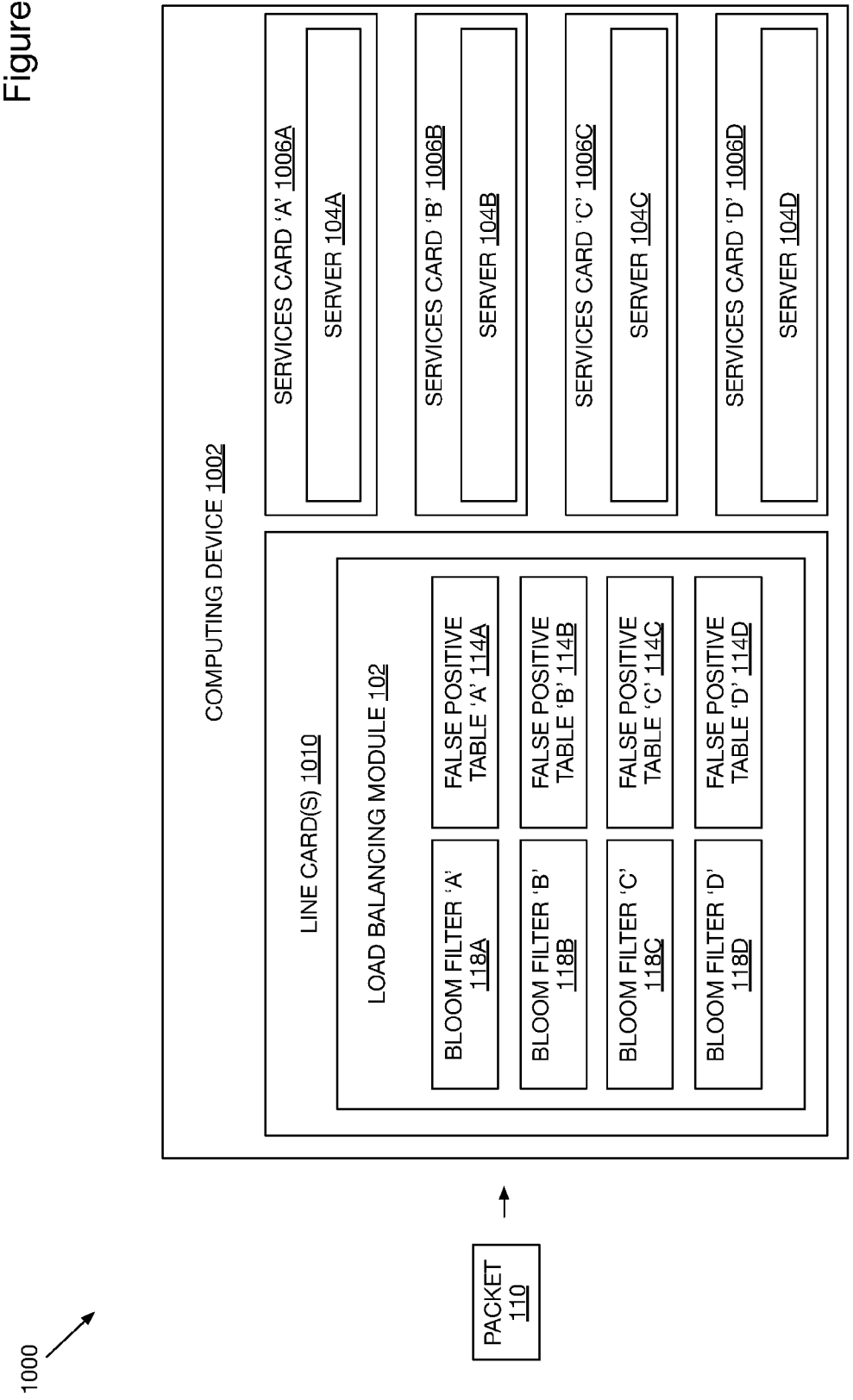
FIG. 10 illustrates a block diagram of a computing device in a system for performing locality sensitive hash-based load balancing of packets according to an embodiment of the invention.

FIG. 10 illustrates a block diagram 1000 of a computing device in a system for performing locality sensitive hash-based load balancing of packets 110 according to an embodiment of the invention. In this depicted embodiment, the load balancing module 102 and a plurality of servers 104A-104D are part of a computing device 1002. In this depicted embodiment, the computing device 1002 comprises one or more line cards 1010 that comprise the load balancing module 102. The depicted load balancing module 102 includes four Bloom filters 118A-118D associated with four false positive tables 114A-114D. In this depicted embodiment, the computing device 1002 further comprises four services cards 1006A-1006D, each comprising a respective server 104A-104D.

The various embodiments described herein provide a near perfect method for flow load balancing, which demands very minimal storage for look-up data structures. Further, the control protocol messaging (i.e., flow messages 140) overhead is minimal, as control messaging is used when new flows are established or deleted, and the rate of such occurrences is very low compared to the regular data packet processing rate. Also, while the control messaging is also used when false positives occur, the false positive probability of Bloom filters is very low. Moreover, the parameters "m" (the number of elements in each Bloom filter bit vector) and "k" (the number of hash functions in each set of hash functions used by the Bloom filters) described above are tunable based on the processing capability of the respective load balancing module 102. Additionally, aspects of the invention are not tied to any specific hardware, and may be used in a variety of environments and configurations.

Having described embodiments of the invention, alternative embodiments will now be described. Like the previous embodiments, these alternative embodiments also allow for performing locality sensitive hash-based load balancing.

For example, some embodiments of the invention use multiple load balancing modules 102 together, which act in concert. Since the servers decide on the flow assignment/re-assignment and the deletions of flows, a scenario of multiple load balancing modules (e.g., multiple line cards in router network device) is just an extension of a single load balancing module scenario. In such embodiments, even if the packets from the same flow arrive at different load balancing modules (e.g. packets on the same flow might arrive at different line cards due to the presence of different network paths), the servers will ensure correct assignment.

While an immense number of possible operations of the servers for determining flow ownership are not described, there are many possible configurations. For example, when a broadcast packet arrives at a server, the server might have a-priori information (synced from the other servers) to decide on flow ownership. Alternatively, each server might have to buffer the packet to perform message exchanges with the other servers to decide on flow ownership. Another alternative configuration is for one server to start with a static assignment for all (or a subset of) new flows. Then, later the server can re-assign the flows to other servers for load re-adjustment, if necessary.

In some embodiments, the servers maintain a well-synced set of Bloom filters themselves. Hence, instead of just sending a flow ownership/deletion message, each server can send both the Bloom filters and the false positive table entries to the load balancing module(s).

Further, in some embodiments, the load balancing module assists the server in decision making, as when the load balancing module sends a packet to a server (unicast or broadcast), it can attach a header in the packet including information (e.g., an identifier field or flag) to distinguish between the above-detailed scenarios 1, 2 or 3 (e.g., where the set of candidate servers includes 0, 1, or 2 or more server identifiers). In an embodiment, the load balancing module attaches the set of server identifiers existing in the false positive table entry for the flow directly into the packet, which can assist the server in quicker decision making of the true ownership of the flow.

Further, in some embodiments the server load details of the servers is synced to the load balancing module. Then, for example, when scenario 1 occurs (i.e., when a packet does not match any Bloom Filter), the load balancing module itself can assign a server for the new flow, and insert into a header of the packet an indication that it has assigned the flow to that particular server. This avoids the broadcasts of packets to the servers and potential subsequent server-server messages and/or the flow ownership message.

In some embodiments, to process an arrived packet, the hash function computations and the Bloom Filters querying can be performed in parallel, as the Bloom Filters are independent of one another. Additionally, if memory capabilities permit, more than one false positive table (e.g., one per server) can be maintained and hence also can be looked-up in parallel.

In some embodiments, the load balancing module 102 includes a faster on-chip memory and a slower off-chip memory. In some of these embodiments, the Bloom filter size can be designed (by varying the number of hash functions, for example) such that the counting Bloom filters can be maintained in the slower off-chip memory, and the bit-map Bloom filters corresponding to the counting Bloom filters can be stored in the faster on-chip memory. In some embodiments of the invention, the hash functions used by the Bloom filters are mathematical computations that are performed mostly (or completely) on register variables of a processor. In some embodiments, the size of the false positive table is small enough that it can, for example, be maintained in regular look-up hardware such as ternary-content addressable memory (T-CAM).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computing device to perform locality sensitive load balancing between a plurality of servers, the computing device comprising:
one or more line cards, wherein each of the one or more line cards includes a set of one or more network interfaces to be communicatively coupled with a network to receive packets, wherein each of the packets includes header field values that identify a flow the packet belongs to, and wherein each of the one or more line cards is adapted to:
for a received packet, generate, based upon one or more of the header field values of the packet, one or more Bloom filter keys;
query a plurality of Bloom filters, using the one or more generated Bloom filter keys, to generate a set of candidate servers of the plurality of servers, wherein the set of candidate servers includes a first server and a second server, wherein each of the plurality of Bloom filters is to indicate whether a corresponding one of the plurality of servers is to be included in the generated set of candidate servers, and wherein the second server is included in the set of candidate servers due to a respective one of the plurality of Bloom filters falsely indicating that the packet is to be destined to the second server;
identify the first server as a destination for the packet based upon identifying a server identifier of the second server within an entry of a false positive table, wherein the false positive table is to include one or more entries corresponding to one or more flows of packets, and wherein each of the one or more entries identifies, for a respective flow of packets, which candidate servers will be falsely included in the sets of candidate servers generated by the plurality of Bloom filters for packets of the flow;
cause the packet to be transmitted to the first server;
generate, based upon one or more header field values of a second received packet, another one or more Bloom filter keys;
query the plurality of Bloom filters, using the another one or more Bloom filter keys, to generate another set of candidate servers of the plurality of servers; and
responsive to the another set of candidate servers being empty, transmit the second received packet to all of the plurality of servers.

2. The computing device of claim 1, wherein each of the one or more line cards is further adapted to:
generate, based upon one or more header field values of a third received packet, a third set of one or more Bloom filter keys;
query the plurality of Bloom filters, using the third set of Bloom filter keys, to generate a third set of candidate servers of the plurality of servers; and
responsive to the third set of candidate servers including two or more candidate servers after attempting to filter the third set of candidate servers using the false positive table, transmit the third received packet to all of the plurality of servers.

3. The computing device of claim 1, wherein the generated set of candidate servers for the packet includes only one candidate server after a filtering of the set of candidate servers using the false positive table.

4. The computing device of claim 1, wherein each of the one or more line cards is further adapted to:
receive flow ownership messages from the plurality of servers, wherein each of the received flow ownership message indicates that the respective transmitting server is to be the destination for a flow of packets; and
responsive to a receipt of a flow ownership message from a server, update the Bloom filter of the plurality of Bloom filters that corresponds to the server to indicate, for any packet belonging to the respective flow of packets, that the server is to be included in that respective set of candidate servers.

5. The computing device of claim 4, wherein each of the one or more line cards is further adapted to, responsive to the receipt of the flow ownership message from the server,
detect that one or more other Bloom filters of the plurality of Bloom filters that do not correspond to the server will cause the one or more respective servers to be falsely included in generated sets of candidate servers for packets of the respective flow; and
update the false positive table to include server identifiers of the one or more respective servers in an entry for the respective flow.

6. The computing device of claim 1, wherein each of the one or more line cards is further adapted to:
receive flow deletion messages from the plurality of servers, wherein each flow deletion message indicates that the respective transmitting server is not to be the destination for a flow of packets; and
responsive to receipt of a flow deletion message from a server, update the Bloom filter of the plurality of Bloom filters that corresponds to the server to indicate, for any packet belonging to the respective flow of packets, that the server is not to be included in that respective set of candidate servers.

7. The computing device of claim 6, wherein the each of the one or more line cards is further adapted to:
further responsive to the receipt of the flow deletion message from the server, remove any entry existing in the false positive table for the respective flow of packets.

8. The computing device of claim 1, wherein the plurality of servers are a plurality of services cards of the computing device.

9. A method in a computing device for locality sensitive load balancing between a plurality of servers, the method comprising:
receiving a packet at a network interface of the computing device, the packet comprising a plurality of header field values;
querying a plurality of Bloom filters, using one or more keys based upon one or more of the plurality of header field values of the packet, to generate a set of candidate servers including a first server and a second server, wherein each of the plurality of Bloom filters indicates whether a corresponding one of the plurality of servers is to be included in the set of candidate servers, and wherein the second server is included in the set of candidate servers due to a respective one of the plurality of Bloom filters falsely indicating that the packet is to be destined to the second server;

identifying the first server as a destination for the packet based upon identifying a server identifier of the second server within an entry of a false positive table, wherein the false positive table includes one or more entries, wherein each of the one or more entries identifies, for a respective flow of packets, servers that are falsely included in sets of candidate servers generated by the plurality of Bloom filters for packets of the flow;

transmitting the packet to the first server;

receiving a second packet that belongs to a second flow of packets;

querying the plurality of Bloom filters, using another one or more keys based upon one or more of the plurality of header field values of the second packet, to generate a second set of candidate servers, wherein the second set of candidate servers is empty; and responsive to the second set of candidate servers being empty, transmitting the second packet to all of the plurality of servers.

10. The method of claim 9, further comprising:

receiving, from a third server of the plurality of servers, a flow ownership message indicating that the third server is to be the destination for any packets belonging to the second flow of packets; and updating one of the plurality of Bloom filters that corresponds to the third server to indicate that the third server is to be included in future sets of candidate servers generated for packets of the second flow.

11. The method of claim 10, further comprising:

receiving a third packet at the network interface, wherein the third packet belongs to the second flow of packets;

querying the plurality of Bloom filters to generate a third set of candidate servers, wherein the third set of candidate servers includes only the third server; and transmitting the third packet to the third server.

12. The method of claim 10, further comprising:

receiving a third packet at the network interface, wherein the third packet belongs to the second flow of packets;

querying the plurality of Bloom filters to generate a third set of candidate servers, wherein the third set of candidate servers includes the third server and a fourth server of the plurality of servers;

determining that the false positive table does not include an entry for the second flow; and responsive to the third set of candidate servers including more than one candidate server, transmitting the third packet to all of the plurality of servers.

13. The method of claim 12, further comprising:

receiving, from the third server, a second flow ownership message indicating that the third server is the destination for any packets belonging to the second flow; and responsive to receipt of the second flow ownership message, inserting an entry for the second flow into the false positive table, wherein the inserted entry identifies the fourth server as being falsely included in sets of candidate servers generated by the plurality of Bloom filters for the second flow.

14. The method of claim 10, further comprising:

receiving, from the third server, a flow deletion message indicating that the third server is not to be the destination for any packets belonging to the second flow of packets; and responsive to receipt of the flow deletion message, updating the one of the plurality of Bloom filters that corresponds to the third server to indicate that the third server is not to be included in sets of candidate servers generated for packets of the second flow.

15. The method of claim 14, further comprising:

removing, from the false positive table, an entry that corresponds to the second flow.

16. The method of claim 10, further comprising:

determining that packets of the second flow will generate candidate sets of servers that include the third server and another server, wherein the another server is one of the first server, the second server, and a fourth server; and inserting or updating an entry for the second flow into the false positive table, wherein the inserted or updated entry identifies the another server as being falsely included in sets of candidate servers generated by the plurality of Bloom filters for the second flow.

17. The method of claim 9, further comprising:

receiving a third packet that belongs to a third flow of packets;

querying the plurality of Bloom filters, using a third set of one or more keys based upon one or more of the plurality of header field values of the third packet, to generate a third set of candidate servers, wherein the third set of candidate servers is empty;

selecting a third server of the plurality of servers to be the destination for any packets belonging to the third flow of packets;

updating a Bloom filter of the plurality of Bloom filters that corresponds to the third server to indicate that the third server is to be included in sets of candidate servers generated for packets belonging to the third flow; and transmitting the third packet to the third server.

18. A non-transitory computer-readable storage medium comprising instructions, that when executed by a processor of a computing device, cause the computing device to implement locality sensitive load balancing between a plurality of servers by performing operations comprising:

receiving a packet at a network interface of the computing device, the packet comprising a plurality of header field values;

querying a plurality of Bloom filters, using one or more keys based upon one or more of the plurality of header field values of the packet, to generate a set of candidate servers including a first server and a second server, wherein each of the plurality of Bloom filters indicates whether a corresponding one of the plurality of servers is to be included in the set of candidate servers, and wherein the second server is included in the set of candidate servers due to a respective one of the plurality of Bloom filters falsely indicating that the packet is to be destined to the second server;

identifying the first server as a destination for the packet based upon identifying a server identifier of the second server within an entry of a false positive table, wherein the false positive table includes one or more entries, wherein each of the one or more entries identifies, for a respective flow of packets, servers that are falsely included in sets of candidate servers generated by the plurality of Bloom filters for packets of the flow;

transmitting the packet to the first server;

receiving a second packet that belongs to a second flow of packets;

querying the plurality of Bloom filters, using another one or more keys based upon one or more of the plurality of header field values of the second packet, to generate a second set of candidate servers, wherein the second set of candidate servers is empty; and responsive to the second set of candidate servers being empty, transmitting the second packet to all of the plurality of servers.

19. The computing device of claim 1, wherein each of the one or more line cards is further adapted to:
  transmit, to all of the plurality of servers along with the second received packet, a flow status flag value indicating that the second received packet belongs to an unknown flow.

20. The method of claim 9, wherein transmitting the second packet to all of the plurality of servers further comprises:
  transmit, to all of the plurality of servers along with the second packet, a flow status flag value indicating that the second packet belongs to an unknown flow.

* * * * *